(12) United States Patent
Mizoguchi et al.

(10) Patent No.: US 9,362,703 B2
(45) Date of Patent: Jun. 7, 2016

(54) OPTICAL DEVICE, LASER APPARATUS, AND EXTREME ULTRAVIOLET LIGHT GENERATION SYSTEM

(71) Applicant: GIGAPHOTON INC., Tochigi (JP)

(72) Inventors: Hakaru Mizoguchi, Oyama (JP); Takashi Suganuma, Oyama (JP); Hideo Hoshino, Oyama (JP); Osamu Wakabayashi, Hiratsuka (JP)

(73) Assignee: GIGAPHOTON INC., Tochigi (JP)

( * ) Notice: Subject to any disclaimer, the term of this patent is extended or adjusted under 35 U.S.C. 154(b) by 0 days.

(21) Appl. No.: 14/485,355

(22) Filed: Sep. 12, 2014

(65) Prior Publication Data

US 2014/0374605 A1    Dec. 25, 2014

Related U.S. Application Data

(62) Division of application No. 13/817,818, filed as application No. PCT/IB2012/000295 on Feb. 17, 2012, now Pat. No. 8,891,161.

(30) Foreign Application Priority Data

Feb. 23, 2011    (JP) .................... 2011-037703

(51) Int. Cl.
| G01C 1/00 | (2006.01) |
| H01S 3/00 | (2006.01) |
| H05G 2/00 | (2006.01) |
| H01S 3/10 | (2006.01) |
| H01S 3/13 | (2006.01) |

(52) U.S. Cl.
CPC ............. *H01S 3/0071* (2013.01); *H01S 3/0014* (2013.01); *H01S 3/10061* (2013.01); *H01S 3/1305* (2013.01); *H05G 2/008* (2013.01)

(58) Field of Classification Search
CPC ...... G01B 11/272; G01B 11/27; G01S 3/706; B23K 26/04
See application file for complete search history.

(56) References Cited

U.S. PATENT DOCUMENTS

| 7,885,311 B2 | 2/2011 | Cho et al. |
| 8,073,036 B2 | 12/2011 | Cho et al. |
| 8,242,472 B2 | 8/2012 | Moriya et al. |
| 8,399,870 B2 | 3/2013 | Moriya et al. |
| 8,692,220 B2 | 4/2014 | Moriya et al. |
| 2008/0233719 A1 | 9/2008 | Omata |

(Continued)

FOREIGN PATENT DOCUMENTS

| JP | H04-6007 U | 1/1992 |
| JP | H04-271035 A | 9/1992 |

(Continued)

OTHER PUBLICATIONS

International Search Report issued in PCT/IB2012/000295, mailed on Aug. 14, 2012.

(Continued)

*Primary Examiner* — Luke Ratcliffe
*Assistant Examiner* — Samantha K Abraham
(74) *Attorney, Agent, or Firm* — Studebaker & Brackett PC

(57) ABSTRACT

An optical device may include: an optical module disposed in a beam delivery path of a laser beam; a beam adjusting unit disposed in the beam delivery path for adjusting the beam delivery path of the laser beam; a measuring unit disposed in the beam delivery path for detecting the beam delivery path; and a control unit for controlling the beam adjusting unit based on a detection result of the beam delivery path of the laser beam detected by the measuring unit.

20 Claims, 36 Drawing Sheets

(56) References Cited

U.S. PATENT DOCUMENTS

| | | |
|---|---|---|
| 2008/0283776 A1 | 11/2008 | Algots et al. |
| 2009/0303476 A1* | 12/2009 | Kosterev ............ G01N 21/1702 356/323 |
| 2010/0117009 A1 | 5/2010 | Moriya et al. |
| 2010/0327192 A1* | 12/2010 | Fomenkov .......... G03F 7/70033 250/504 R |
| 2011/0220816 A1 | 9/2011 | Kakizaki et al. |
| 2012/0319014 A1 | 12/2012 | Moriya et al. |
| 2013/0187065 A1 | 7/2013 | Moriya et al. |

FOREIGN PATENT DOCUMENTS

| | | |
|---|---|---|
| JP | 2001-028470 A | 1/2001 |
| JP | 2001-358383 A | 12/2001 |
| JP | 2002-162551 A | 6/2002 |
| JP | 2008-277705 A | 11/2008 |
| JP | 2009-099785 A | 5/2009 |
| JP | 2010-135769 A | 6/2010 |
| WO | 2010/059210 A2 | 5/2010 |

OTHER PUBLICATIONS

Notice of Reason for Rejection issued in Japanese Application No. 2011-037703 dated Sep. 16, 2014, with English translation.

An Office Action; "Notice of Reason for Rejection," issued by the Japanese Patent Office on Mar. 3, 2015, which corresponds to Japanese Patent Application No. 2011-037703 and is related to U.S. Appl. No. 14/485,355; with English language translation.

* cited by examiner

OPTICAL DEVICE, LASER APPARATUS, AND EXTREME ULTRAVIOLET LIGHT GENERATION SYSTEM

RELATED APPLICATIONS

This application is a divisional of U.S. patent application Ser. No. 13/817,818, filed Apr. 26, 2013, which is the U.S. National Phase under 35 U.S.C. §371 of International Application No. PCT/IB2012/000295, filed on Feb. 17, 2012, which in turn claims the benefit of Japanese Application No. 2011-037703, filed on Feb. 23, 2011, the disclosures of which Applications are incorporated by reference herein.

BACKGROUND

1. Technical Field

This disclosure relates to an optical device, a laser apparatus, and an extreme ultraviolet (EUV) light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication at 32 nm or less, for example, an exposure apparatus is expected to be developed, in which a system for generating extreme ultraviolet (EUV) light at a wavelength of approximately 13 nm is combined with a reduced projection reflective optical system.

Three kinds of systems for generating EUV light have been known in general, which include an LPP (Laser Produced Plasma) type system in which plasma generated by irradiating a target material with a laser beam is used, a DPP (Discharge Produced Plasma) type system in which plasma generated by electric discharge is used, and an SR (Synchrotron Radiation) type system in which orbital radiation is used.

SUMMARY

An optical device according to one aspect of this disclosure may include: an optical module disposed in a beam delivery path of a laser beam; a beam adjusting unit disposed in the beam delivery path for adjusting the beam delivery path of the laser beam; a measuring unit disposed in the beam delivery path for detecting the beam delivery path; and a control unit for controlling the beam adjusting unit based on a detection result of the beam delivery path of the laser beam detected by the measuring unit.

A laser apparatus according to another aspect of this disclosure may include the above optical device.

An extreme ultraviolet light generation system according to yet another aspect of this disclosure may include the above laser apparatus.

DESCRIPTION OF PREFERRED EMBODIMENTS

Figure 1:
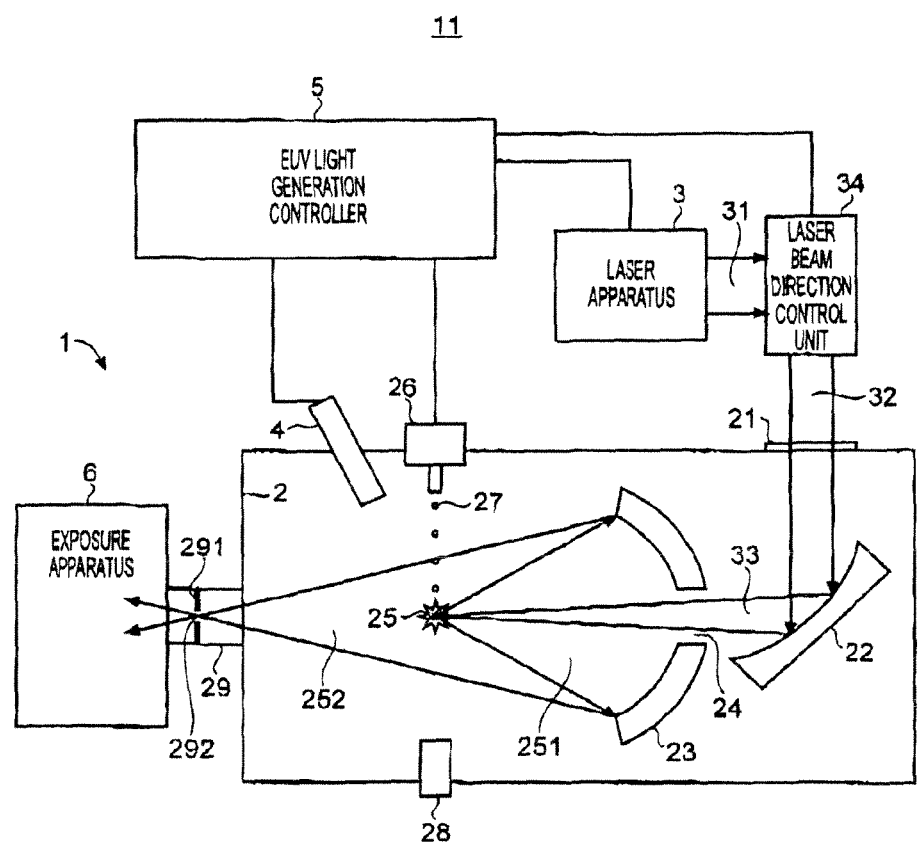
FIG. 1 schematically illustrates the configuration of an exemplary LPP type EUV light generation system.

Hereinafter, selected embodiments of this disclosure will be described in detail with reference to the accompanying drawings. The embodiments to be described below are merely illustrative in nature and do not limit the scope of this disclosure. Further, the configuration and operation described in each embodiment are not all essential in implementing this disclosure. Note that like elements are referenced by like reference numerals or characters and duplicate descriptions thereof will be omitted herein.

Optical devices, laser apparatuses, and extreme ultraviolet (EUV) light generation systems according to the embodiments of this disclosure will be described in detail with reference to the accompanying drawings. The embodiments of this disclosure will be described following the table of contents below.

Contents
1. Summary
2. Terms
3. EUV Light Generation System
   3.1 Configuration
   3.2 Operation
4. Laser Apparatus for LPP Type EUV Light Generation System
   4.1 Configuration
   4.2 Operation
   4.3 Problems
5. Overview of Optical Device
   5.1 Configuration
   5.2 Operation
   5.3 Effect
6. Case Where Optical Module is Amplifier
   6.1 Slab Amplifier
   6.2 Fast-Axial-Flow Amplifier
7. Variations of Optical Module
   7.1 Relay Optical System
   7.2 Spatial Filter
   7.3 Saturable Absorber Cell
   7.4 Beam Delivery Path Length Adjusting Module
   7.5 Polarization Isolator
8. Beam Adjusting Unit
   8.1 Two High-Reflection Mirrors
   8.2 Combination of High-Reflection Mirror and VRMWM High-Reflection Mirror
   8.3 Combination of High-Reflection Mirror And Deformable High-Reflection Mirror
9. Measuring Unit
   9.1 Beam Profile Measurement at Two Points on Beam Delivery Path
   9.2 Beam Profile And Beam Pointing
   9.3 Combination of Plate with Through-Hole And Beam Profiler
   9.4 Combination of Optical Module and Beam Profiler
   9.5 Shack-Hartmann Interferometer
10. Control Unit
    10.1 Control Flow in Control Unit
    10.2 Variations of Control Flow
11. LPP Type EUV Light Generation System
    11.1 Configuration
    11.2 Control Flow of Laser Controller
12. Laser Apparatus Including Guide Laser Apparatus and EUV Light Generation System
    12.1 Configuration
    12.2 Control Flow of Laser Controller
13. Positioning Mechanism
    13.1 Positioning with Pins
    13.2 Positioning with Rails
14. Supplementary Description 1. Summary An overview of the embodiments will be given below. An optical device of one embodiment may include an optical module disposed in a beam delivery path of a laser beam, a beam adjusting unit disposed in the beam delivery path for adjusting the beam delivery path of the laser beam, and a measuring unit disposed in the beam delivery path for detecting the beam delivery path of the laser beam.

2. Terms

Terms used in this application will be defined as follows. The term "droplet" may refer to a liquid droplet of a molten target material. Accordingly, the shape of a droplet may be substantially spherical due to its surface tension. The term "plasma generation region" may refer to a three-dimensional space predefined as a space in which plasma is to be generated.

3. Overview of EUV Light Generation System 3.1 Configuration

FIG. 1 schematically illustrates the configuration of an exemplary LPP type EUV light generation system. An EUV light generation apparatus 1 may be used with at least one laser apparatus 3. In this disclosure, a system including the EUV light generation apparatus 1 and the laser apparatus 3 may be referred to as an EUV light generation system 11. As illustrated in FIG. 1 and described in detail below, the EUV light generation apparatus 1 may include a chamber 2, a target supply unit (droplet generator 26, for example), and so forth. The chamber 2 may be airtightly sealed. The target supply unit may be mounted to the chamber 2 so as to penetrate a wall of the chamber 2, for example. A target material to be supplied by the target supply unit may include, but is not limited to, tin, terbium, gadolinium, lithium, xenon, or any combination thereof.

The chamber 2 may have at least one through-hole formed in its wall, and a pulsed laser beam 32 may travel through the through-hole. Alternatively, the chamber 2 may be provided with a window 21, through which the pulsed laser beam 32 may travel into the chamber 2. An EUV collector mirror 23 having a spheroidal surface may be disposed inside the chamber 2, for example. The EUV collector mirror 23 may have a multi-layered reflective film formed on the spheroidal surface thereof. The reflective film may comprise a molybdenum layer and a silicon layer being laminated alternately, for example. The EUV collector mirror 23 may have first and second foci, and preferably be disposed such that the first focus lies in a plasma generation region 25 and the second focus lies in an intermediate focus (IF) 292 defined by the specification of an external apparatus, such as an exposure apparatus 6. The EUV collector mirror 23 may have a through-hole formed at the center thereof, and a pulsed laser beam 33 may travel through the through-hole toward the plasma generation region 25.

The EUV light generation system 11 may include an EUV light generation controller 5. Further, the EUV light generation apparatus 1 may include a target sensor 4. The target sensor 4 may have an imaging function and detect at least one of the presence, trajectory, and position of a target.

Further, the EUV light generation apparatus 1 may include a connection 29 for allowing the interior of the chamber 2 and the interior of the exposure apparatus 6 to be in communication with each other. A wall 291 having an aperture may be disposed inside the connection 29, and the wall 291 may be disposed such that the second focus of the EUV collector mirror 23 lies in the aperture formed in the wall 291.

Further, the EUV light generation system 11 may include a laser beam direction control unit 34, a laser beam focusing mirror 22, and a target collection unit 28 for collecting targets 27. The laser beam direction control unit 34 may include an optical element for defining the direction into which the laser beam travels and an actuator for adjusting the position and the posture of the optical element.

3.2 Operation

With reference to FIG. 1, a pulsed laser beam 31 outputted from the laser apparatus 3 may travel through the window 21 via the laser beam direction control unit 34, and as a pulsed laser beam 32, may enter the chamber 2. The pulsed laser beam 32 may travel inside the chamber 2 along at least one beam path, be reflected by the laser beam focusing mirror 22, and as a pulsed laser beam 33, strike at least one target 27.

The droplet generator 26 may output targets 27 toward the plasma generation region 25 inside the chamber 2. The target 27 may be irradiated with at least one pulse included in the pulsed laser beam 33. The target 27 that has been irradiated with the pulsed laser beam 33 may be turned into plasma, and rays of light including EUV light 252 may be emitted from the plasma. The EUV light 252 may be collected and reflected by the EUV collector mirror 23. The EUV light 252 reflected by the EUV collector mirror 23 may travel through the intermediate focus 292 and be outputted to the exposure apparatus 6. The target 27 may be irradiated with multiple pulses included in the pulsed laser beam 33.

The EUV light generation controller 5 may control the entire EUV light generation system 11. The EUV light generation controller 5 may process image data of the droplet 27 captured by the target sensor 4. Further, the EUV light generation controller 5 may control at least one of the timing at which the target 27 is outputted and the direction into which the target 27 is outputted, for example. Furthermore, the EUV light generation controller 5 may control at least one of the timing at which the laser apparatus 3 oscillates, the direction in which the pulsed laser beam 32 travels, and the position at which the pulsed laser beam 33 is focused, for example. The various controls mentioned above are merely examples, and other controls may be added as necessary.

4. Laser Apparatus for Lpp Type EUV Light Generation System

Figure 2:
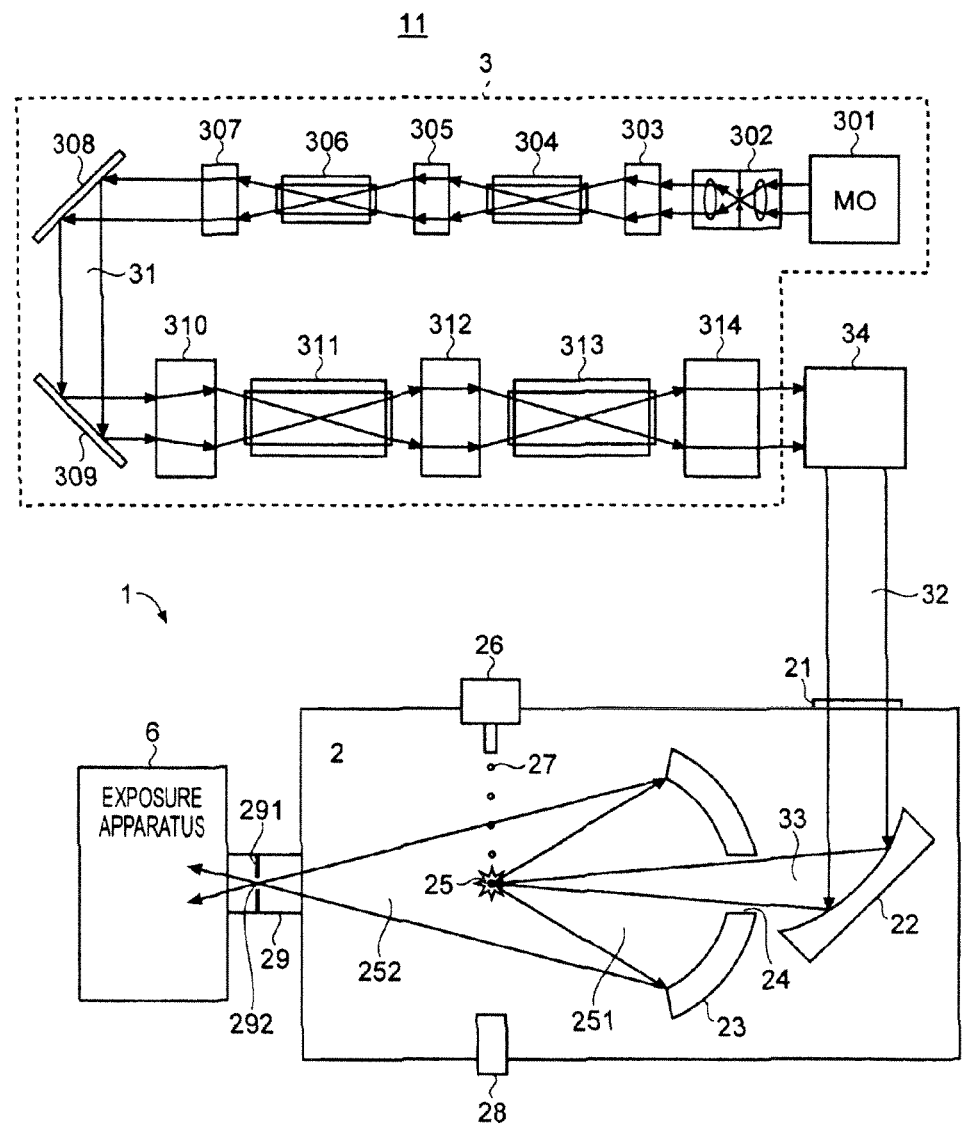
FIG. 2 is a diagram more concretely illustrating the laser apparatus in the EUV light generation system shown in FIG. 1.

The laser apparatus 3 in the EUV light generation system 11 shown in FIG. 1 will be described in more detail. FIG. 2 is a diagram more concretely illustrating the laser apparatus 3 shown in FIG. 1. Here, the EUV light generation controller 5 and the target sensor 4 shown in FIG. 1 are omitted in FIG. 2 for brevity.

4.1 Configuration

As illustrated in FIG. 2, the laser apparatus 3 may include a master oscillator (MO) 301, amplifiers 304, 306, 311, and 313, and relay optical systems 303, 305, 307, 310, 312, and 314. The amplifiers 304, 306, 311, and 313 may amplify the beam intensity of the pulsed laser beam 31. Each of the relay optical systems 303, 305, 307, 310, 312, and 314 may expand the diameter of the pulsed laser beam 31 or collimate the pulsed laser beam 31. The laser apparatus 3 may further include a spatial filter 302 for adjusting optical properties of the pulsed laser beam 31 outputted from the master oscillator 301, and high-reflection mirrors 308 and 309 for modifying the beam delivery path of the pulsed laser beam 31.

In the description to follow, the amplifiers 304, 306, 311, and 313, and the relay optical systems 303, 305, 307, 310, 312, and 314 may be collectively referred to as optical modules. Other devices and components having optical properties, such as the master oscillator 301, the spatial filter 302, the high-reflection mirrors 308 and 309, and so forth may also be referred to as optical modules in this disclosure.

4.2 Operation

The master oscillator 301 may oscillate at a predetermined repetition rate so as to output the pulsed laser beam 31, under the control of the EUV light generation controller 5 shown in FIG. 1, for example. The outputted pulsed laser beam 31 may pass through the spatial filter 302 and sequentially be amplified by the amplifiers 304, 306, 311, and 313. The pulsed laser beam 31 may pass through each of the relay optical systems 303, 305, 307, 310, 312, and 314 which adjust the beam profile, polarization state, and so forth of the pulsed laser beam 31 so as to be suitable for the size, shape, and so forth, of the amplification region in the amplifiers 304, 306, 311, and 313, respectively. Thereafter, the pulsed laser beam 31 may be outputted from the laser apparatus 3, pass through the laser beam direction control unit 34, and enter the chamber 2.

4.3 Problems

The beam delivery path between the master oscillator 301 and the plasma generation region 25 may have a few tens of meters to over a hundred meters in length. Accordingly, it may take along time to align the beam delivery path between the master oscillator and the target irradiation position via the respective optical modules at installation, at maintenance work, at repair work, and so forth. This time may be a few days to a few weeks.

5. Overview of Optical Device

Figure 3:
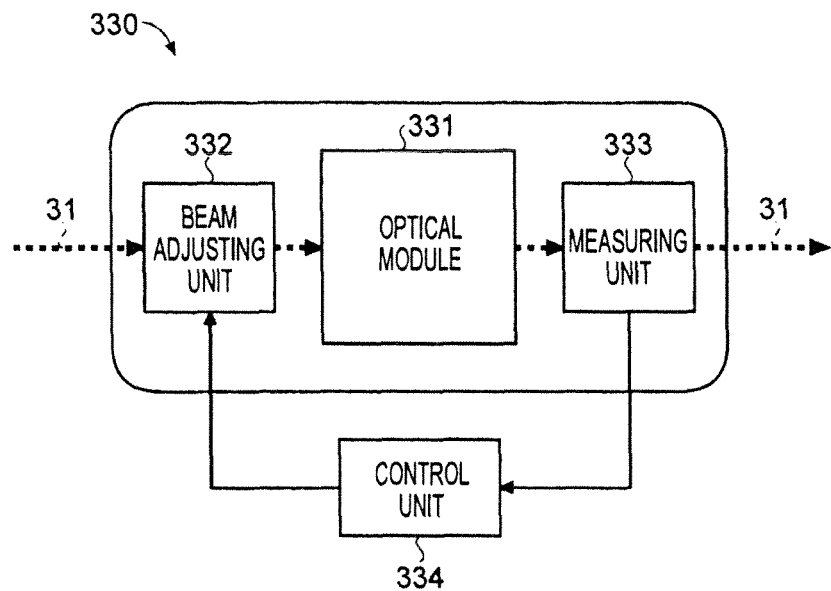
FIG. 3 illustrates one mode of an optical device according to one embodiment.

Accordingly, in this disclosure, the following may be proposed. FIG. 3 illustrates one embodiment of an optical device and FIG. 4 illustrates another embodiment of an optical device.

5.1 Configuration

Figure 4:
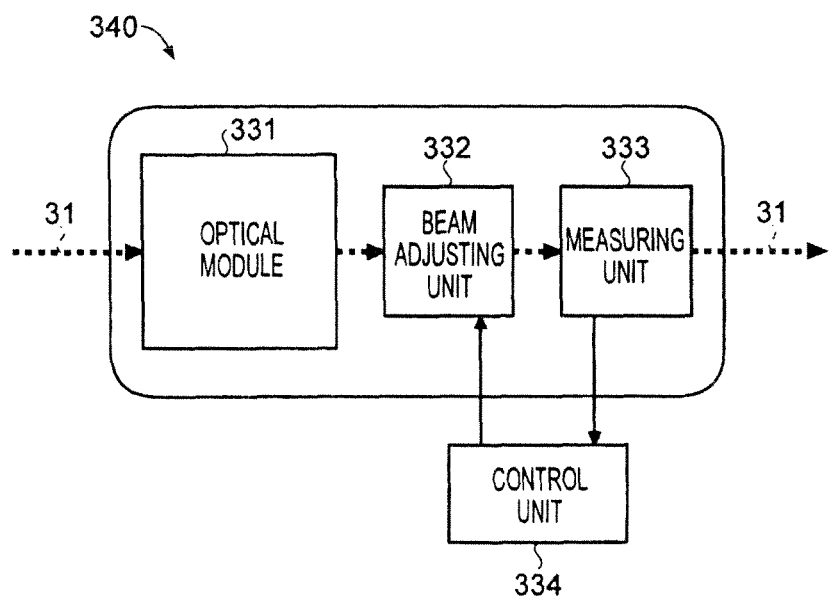
FIG. 4 illustrates another mode of an optical device according to another embodiment.

As illustrated in FIGS. 3 and 4, optical devices 330 and 340 may each include an optical module 331, a beam adjusting unit 332, and a measuring unit 333, each of which is disposed in the beam delivery path of the pulsed laser beam 31. Further, the optical devices 330 and 340 may each include a control unit 334.

The beam adjusting unit 332, the optical module 331, and the measuring unit 333 can be arranged in that order from the inlet to the outlet of the pulsed laser beam 32 in the optical device, as shown in FIG. 3. Alternatively, the optical module 331, the beam adjusting unit 332, and the measuring unit 333 can be arranged in that order from the inlet to the outlet of the pulsed laser beam 32 in the optical device, as shown in FIG. 4.

5.2 Operation

The measuring unit 333 may detect the beam delivery path of the pulsed laser beam 31. The control unit 334 may control the beam adjusting unit 332 based on the detection result by the measuring unit 333. For example, the measuring unit 333 detects the beam delivery paths before and after the optical module 331 is replaced. The controller 334 may identify an amount of change between the beam delivery paths before and after the optical module 331 is replaced. Then, the control unit 334 may actuate the beam adjusting unit 332 in accordance with the amount of change, whereby the current beam delivery path may be brought back to the previous beam delivery path before the optical module is replaced.

5.3 Effect

In this way, according to the embodiments of this disclosure, the operation for bringing the beam delivery path of the pulsed laser beam 31 outputted from the optical device 330 or 340 back to the correct path (desired beam delivery path) may be carried out automatically. As a result, even when the optical module 331 is newly installed or is replaced, for example, the beam delivery path may be adjusted to the correct path easily and quickly.

6. Case where Optical Module is Amplifier

Figure 5:
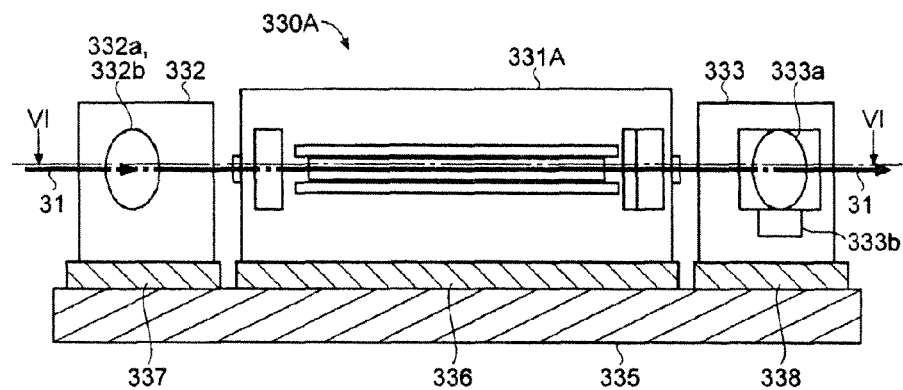
FIG. 5 is a sectional view of the optical device shown in FIG. 3, in which the optical module is embodied by a slab amplifier.
Figure 6:
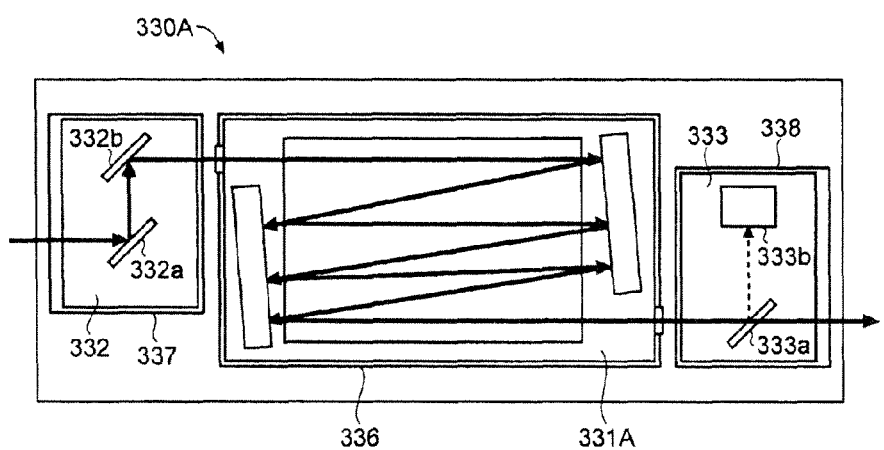
FIG. 6 is a sectional view of the optical device shown in FIG. 5, taken along VI-VI plane.

Hereinafter, specific examples of the optical devices will be described. FIG. 5 is a sectional view of an optical device 330A, in which the optical module 331 is a slab amplifier 331A. FIG. 6 is a sectional view of the optical device 330A shown in FIG. 5, taken along VI-VI plane. The amplifier 331A may be any of the amplifiers 304, 306, 311, and 313.

6.1 Slab Amplifier

As illustrated in FIGS. 5 and 6, the optical device 330A may include the actuator 332, a slab amplifier 331A, the measuring unit 333, and positioning plates 336 through 338 for positioning the actuator 332, the slab amplifier 331A, and the measuring unit 333 respectively at predetermined locations on a face plate 335. The positioning plates 336 through 338 may be positioned and attached on the face plate. The beam adjusting unit 332, the slab amplifier 331A, and the measuring unit 333 may respectively be disposed at positions set on the positioning plates 336 through 338. With this, the beam adjusting unit 332, the slab amplifier 331A, and the measuring unit 333 may be roughly aligned.

For example, the slab amplifier 331A, which is configured as a single unit, may be disposed at a position set on the positioning plate 336. Further, as for the beam adjusting unit 332 including mirrors 332a and 332b, the mirrors 332a and 332b may be disposed respectively at positions set on the positioning plate 337 via optical element holding members, such as holders (not shown). Here, the holders for holding the mirrors and the posture adjusting mechanisms for the holders will be described later in detail. Further, as for the measuring unit 333 including beam splitters 333a and 333b, the beam splitters 333a and 333b may be disposed respectively at positions set on the positioning plate 338 via optical element holding members, such as holders (not shown). That is, a unitized optical element group (e.g., the slab amplifier 331A) may be disposed at a position set on a positioning plate. As for an optical element group including a plurality of components, each of the plurality of the components (e.g., mirrors 332a and 332b, the beam splitter 333a) may be disposed at a position set on a positioning plate.

For example, when a malfunctioning slab amplifier 331A is replaced, the malfunctioning slab amplifier 331A may be removed and then a properly working slab amplifier 331A may be disposed on the positioning plate 336. With this, the properly working slab amplifier 331A may be roughly aligned first. After the new slab amplifier 331A is installed, the master oscillator 301 may be controlled to oscillate. Then, the controller 334 may control the beam adjusting unit 332, based on the detection values by the measuring unit 333, such that the beam delivery path of the pulsed laser beam 31 passing through the slab amplifier 331A coincides with the beam delivery path of the pulsed laser beam 31 before the slab amplifier 331A is replaced. With this, the alignment of the optical device 330A may be carried out automatically.

6.2 Fast-Axial-Flow Amplifier

Figure 7:
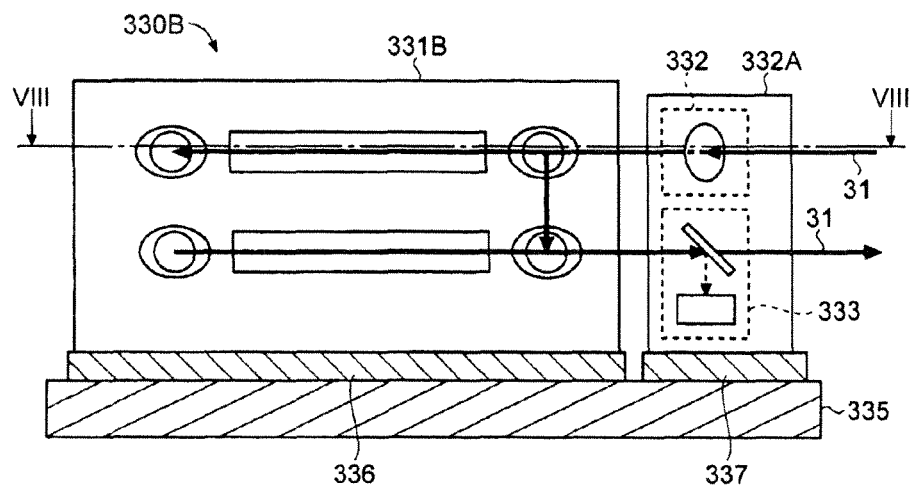
FIG. 7 is a sectional view of the optical device shown in FIG. 3, in which the optical module is embodied by a fast-axial-flow amplifier.
Figure 8:
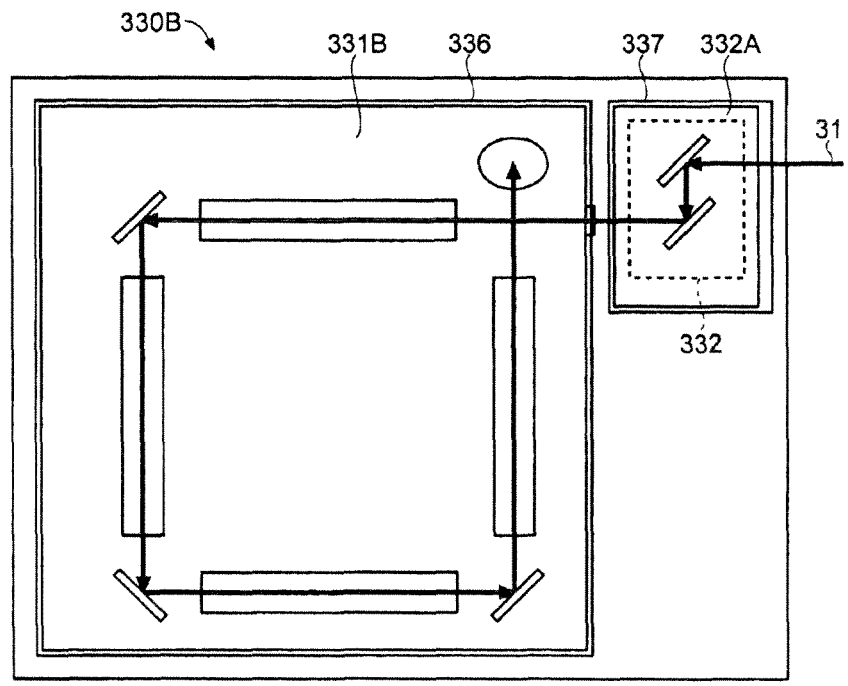
FIG. 8 is a sectional view of the optical device shown in FIG. 7, taken along VIII-VIII plane.

The case where a fast-axial-flow amplifier 331B is used for the optical module 331 will be described below. FIG. 7 is a sectional view of an optical device 330B, in which the optical module 331 may be the fast-axial-flow amplifier 331B. FIG. 8 is a sectional view of the optical device 330B shown in FIG. 7, taken along VIII-VIII plane.

In the fast-axial-flow amplifier 331B shown in FIGS. 7 and 8, an inlet and an outlet of the pulsed laser beam 31 are formed adjacently on the same surface. Accordingly, for such fast-axial-flow amplifier 331B, the beam adjusting unit 332 and the measuring unit 333 may be disposed adjacently. Thus, in this example, the beam adjusting unit 332 and the measuring unit 333 may be configured as a single unit 332A.

In this way, unitizing the beam adjusting unit 332 and the measuring unit 333 may make it possible to reduce the optical device in size. Further, unitizing the beam adjusting unit 332 and the measuring unit 333 may make it possible to reduce detection errors of the beam delivery path in each component.

7. Variations of Optical Module

Subsequently, variations of the optical module 331 will be described below. Other examples of the optical module 331 may include a spatial filter, a saturable absorber cell, a beam delivery path length adjusting unit, a polarization control optical system, a wavefront adjusting unit, and so forth.

7.1 Relay Optical System

Figure 9:
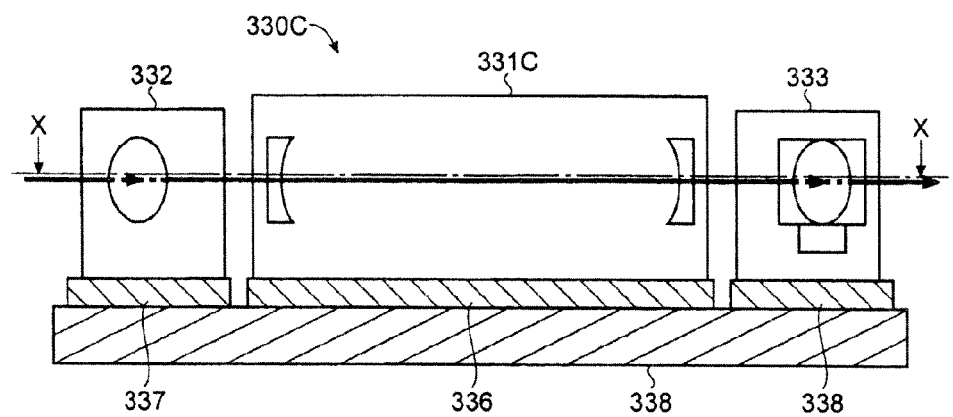
FIG. 9 is a sectional view of the optical device shown in FIG. 3, in which the optical module is embodied by a relay optical system that includes two concave mirrors.
Figure 10:
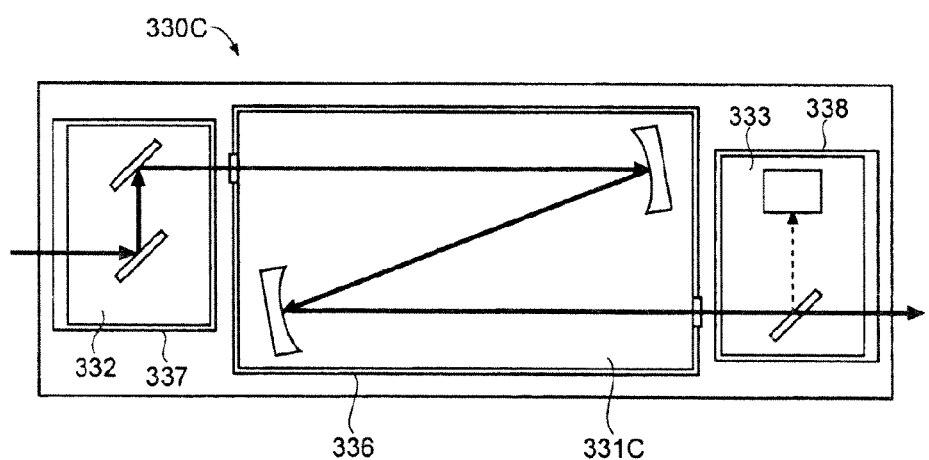
FIG. 10 is a sectional view of the optical device shown in FIG. 9, taken along X-X plane.

FIG. 9 is a sectional view of an optical device 330C, in which the optical module 331 may be a relay optical system 331C including two concave mirrors. FIG. 10 is a sectional view of the relay optical system 331C shown in FIG. 9, taken along X-X plane. The relay optical system 331C may be any of the relay optical systems 303, 305, 307, 310, 312, and 314. Providing such relay optical system 331C with the beam adjusting unit 332 and the measuring unit 333 may make it possible to carry out the alignment easily and quickly after replacing the relay optical system 331C with another relay optical system.

7.2 Spatial Filter

Figure 11:
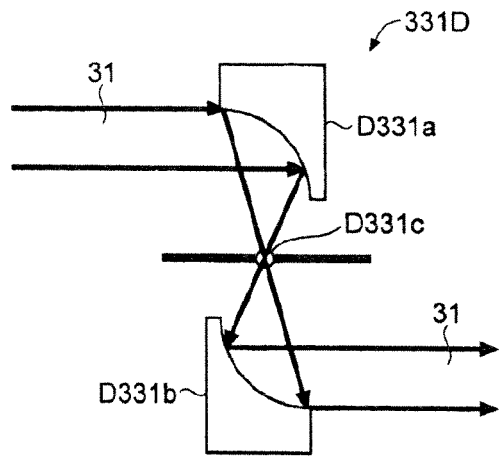
FIG. 11 illustrates a case where a spatial filter serves as the optical module shown in FIG. 3.

The optical module 331 may be a spatial filter 331D shown in FIG. 11. The spatial filter 331D may include two off-axis paraboloidal mirrors D331a and D331b and a pinhole plate D331c. The off-axis paraboloidal mirrors D331a and D331b and the pinhole plate D331c may be disposed such that the respective foci of the off-axis paraboloidal mirrors D331a and D331b lie in the pinhole in the pinhole plate D331c.

In FIG. 11, the off-axis paraboloidal mirrors D331a and D331b are disposed so that a laser beam is incident thereon at 45 degrees, respectively. However, this disclosure is not limited thereto. For example, a spatial filter may be implemented by a spherical concave mirror, a convex lens, and so forth.

7.3 Saturable Absorber Cell

Figure 12:
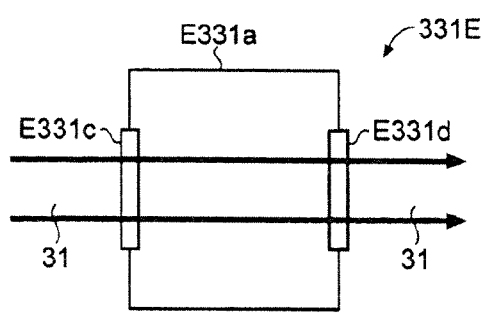
FIG. 12 illustrates a case where a saturable absorber cell serves as the optical module shown in FIG. 3.

The optical module 331 may be a saturable absorber cell 331E shown in FIG. 12. The saturable absorber cell 331E may include an input window E331c, a chamber E331a, and an output window E331d. The chamber E331a may be filled with a gas that is a saturable absorber (such as $SF_6$) or a mixed gas containing a saturable absorber. For example, a circulation mechanism and a cooling mechanism are provided to the chamber E331a so that the gas circulates in the chamber E331a and the cooling mechanism.

7.4 Beam Delivery Path Length Adjusting Module

Figure 13:
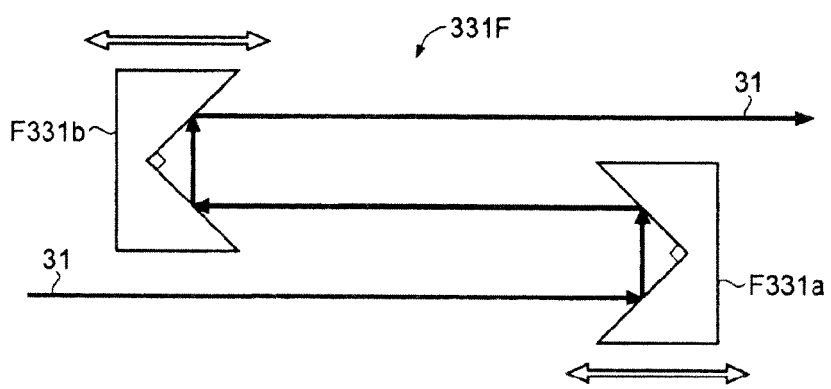
FIG. 13 illustrates a case where a beam delivery path length adjusting module serves as the optical module shown in FIG. 3.

The optical module 331 may be a beam delivery path length adjusting module 331F shown in FIG. 13. The beam delivery path length adjusting module 331F may include mirrors F331a and F331b, each of which may be arranged such that two reflective surfaces meet at 90 degrees, for example. At least one of the mirrors F331a and F331b may be moved in the direction parallel to the beam delivery path (in the direction shown by a white arrow), whereby the length of the beam delivery path of the pulsed laser beam 31 may be adjusted.

7.5 Polarization Isolator

Figure 14:
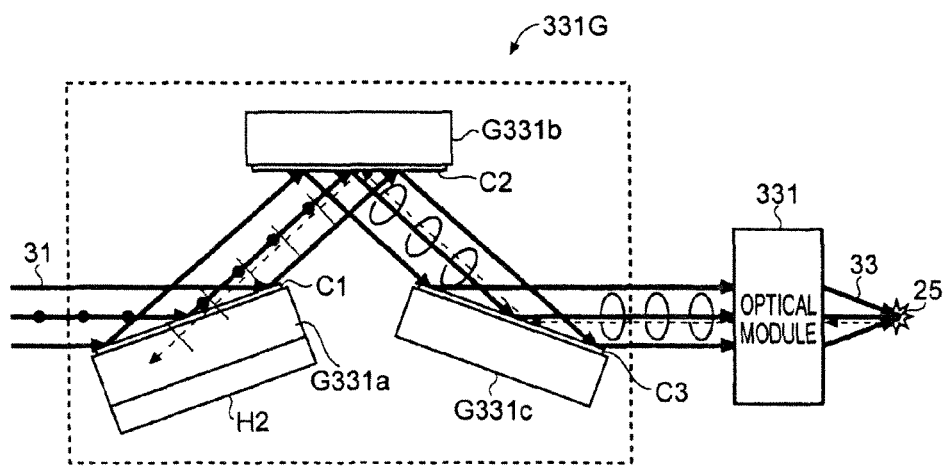
FIG. 14 illustrates a case where a polarization isolator serves as the optical module shown in FIG. 3.

The optical module 331 may be a polarization isolator 331G shown in FIG. 14. The polarization isolator 331G may include mirrors G331a through G331c.

The mirror G331a may have a coating C1 formed thereon for reflecting the S-polarized component of a pulsed laser beam with high reflectivity and transmitting the P-polarized component of the pulsed laser beam. A heat sink may be disposed on a surface opposite to the reflective surface of the mirror G331a for cooling the mirror G331a. Further, the mirror G331b may have a quarter-wave coating C2 formed thereon for transforming a linearly polarized pulsed laser beam into a circularly polarized pulsed laser beam. The mirror G331c may have a coating C3 formed thereon for reflecting a pulsed laser beam incident thereof with high reflectivity without changing its polarization.

The mirror G331a may reflect the S-polarized component of the pulsed laser beam 31 toward the mirror G331b. The mirror G331b may transform the pulsed laser beam 31 incident thereon into a circularly polarized laser beam and reflect the circularly polarized laser beam toward the mirror G331c with high reflectivity. The mirror G331c may reflect the pulsed laser beam 31 incident thereon without changing its polarization. The circularly polarized pulsed laser beam 31 may then be focused in the plasma generation region 25 by a focusing optical system, such as the laser beam focusing mirror 22. With this, the droplet 27 supplied to the plasma generation region 25 may be irradiated with the pulsed laser beam 33 in the plasma generation region 25.

Part of the pulsed laser beam 33 may be reflected by the droplet 27 in the plasma generation region 25. Part of the circularly polarized pulsed laser beam 33 reflected by the droplet 27 may, as a returning beam, be collimated by the focusing optical system and be reflected by the mirror G331c with high reflectivity. Then, the reflected circularly polarized pulsed laser beam 33 may be transformed, by the mirror G331b, into a linearly polarized pulsed laser beam, which may be incident on the mirror G331a as the P-polarized component. This linearly polarized pulsed laser beam may be transmitted through the coating C1 on the mirror G331a and be absorbed by the base plate material. In this way, the returning beam reflected by the droplet 27 may be absorbed by the polarization isolator 331G.

8. Beam Adjusting Unit

Hereinafter, the beam adjusting unit 332 in the optical device will be described with examples.

8.1 Two High-reflection Mirrors

Figure 15:
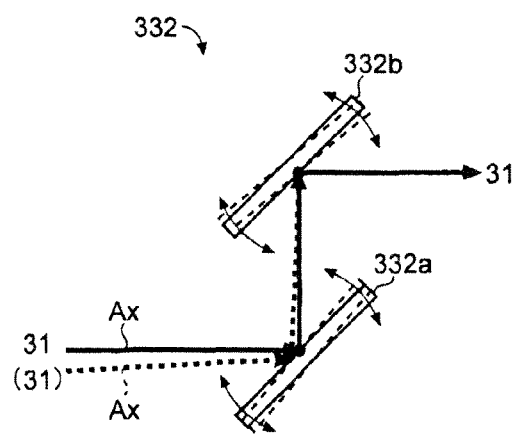
FIG. 15 illustrates an example of a beam adjusting unit shown in FIG. 3.

FIG. 15 illustrates an example of the beam adjusting unit 332. As illustrated in FIG. 15, the beam adjusting unit 332 may include two mirrors 332a and 332b, and mirror holders (see FIG. 16) for holding the respective mirrors, for example. The mirrors 332a and 332b may be held by the mirror holders each equipped with a gimbal mechanism capable of controlling the posture (tilt) angles ($\theta x$, $\theta y$) of the respective mirrors. Controlling the posture angles ($\theta x$, $\theta y$) of the respective mirrors 332a and 332b may make it possible to adjust the beam delivery path of the pulsed laser beam 31 to a desired beam delivery path. Note that the X-direction of the tilt angle $\theta x$ is perpendicular to the Y-direction of the tilt angle $\theta y$ (see FIG. 16).

Figure 16:
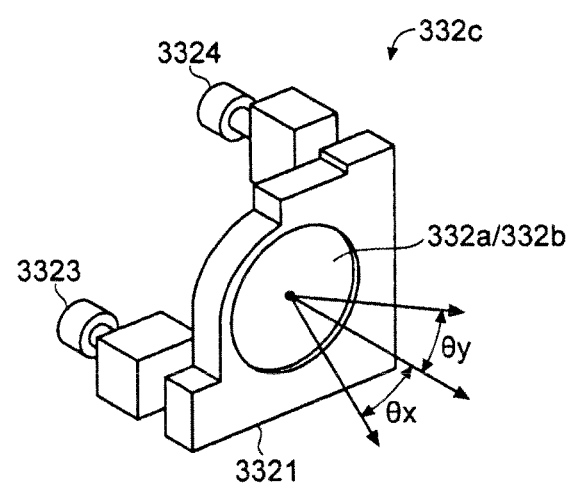
FIG. 16 illustrates an example of a mirror holder for holding a mirror shown in FIG. 15.

Here, FIG. 16 illustrates an example of a mirror holder 332c for holding the mirrors 332a and 332b. As illustrated in FIG. 16, the mirror holder 332c may include a holder 3321 for holding the flat mirror 332a or 332b and automatic micrometers 3323 and 3324, for example. Mounting the holder 3321 to a predetermined plate via the automatic micrometers 3323 and 3324 may make it possible to adjust the tilt angle $\theta x$ in X-direction and the tilt angle $\theta y$ in Y-direction of the flat mirror 332a or 332b with respect to the predetermined plate. A commercially available product may be used for such mirror holder. For example, AG-M100NV6 manufactured by Newport Corporation may be used.

In this way, the beam delivery path of the pulsed laser beam 31 may be adjusted to a desired beam delivery path by controlling the posture angles ($\theta x$, $\theta y$) of the respective mirrors 332a and 332b. Here, the configuration of the beam adjusting unit 332 is not limited to the configuration shown in FIG. 15. For example, two wedge substrates which transmit a laser beam may be disposed in the beam delivery path of the pulsed laser beam 31. In this configuration, rotating the respective wedge substrates about the center axis of the beam delivery path may make it possible to adjust the beam delivery path of the pulsed laser beam 31 to a desired beam delivery path. In this way, the beam adjusting unit 332 may be configured so as to include a mechanism with which the beam delivery path of the pulsed laser beam 31 can be adjusted to a desired beam delivery path.

8.2 Combination of High-Reflection Mirror and VRMWM

High-Reflection Mirror

Figure 17:
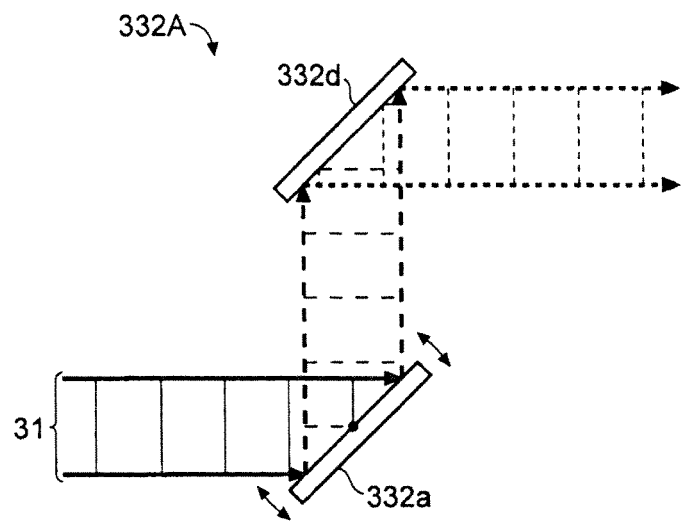
FIG. 17 illustrates another example of a beam adjusting unit shown in FIG. 3.
Figure 18:
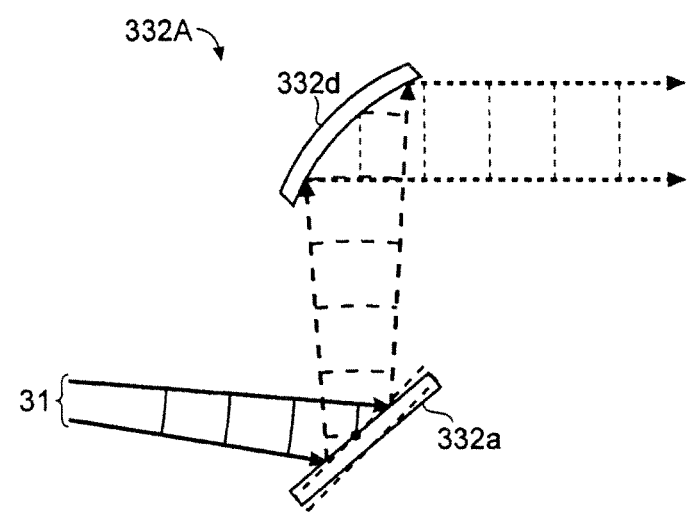
FIG. 18 illustrates an example in which the beam adjusting unit shown in FIG. 17 is actuated.

The beam adjusting unit 332 may be replaced by a beam adjusting unit 332A shown in FIGS. 17 and 18. As illustrated in FIG. 17, the beam adjusting unit 332A may include one of the mirrors 332a and 332b of the beam adjusting unit 332 shown in FIG. 16 (the mirror 332b in this example) is replaced by a Variable Radius Waveform Mirror (VRWM) 332d, with which the wavefront of the reflected laser beam can be controlled by actuating an actuator (not shown) connected to the VRWM 332d. In this way, using the mirror 332a and the VRWM 332d may make it possible to correct both the beam delivery path and the wavefront of the pulsed laser beam 31 with a small number of optical elements (two in this example). FIG. 18 illustrates an example of the wavefront correction by the beam adjusting unit 332A.

8.3 Combination of High-reflection Mirror and Deformable High-reflection Mirror

Figure 19:
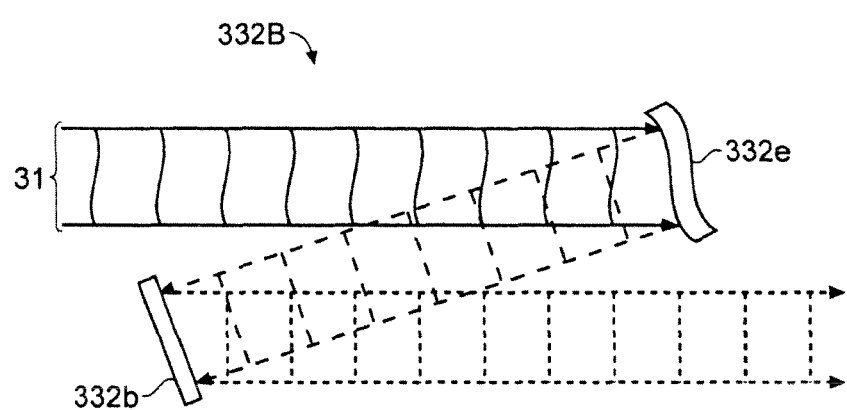
FIG. 19 illustrates another example of a beam adjusting unit shown in FIG. 3.

The beam adjusting unit 332 capable of correcting both the beam delivery path and the wavefront of the reflected laser beam may be configured as shown in FIG. 19, as well. A beam adjusting unit 332B shown in FIG. 19 may include the high-reflection mirror 332b, a deformable mirror 332e, and an actuator (not shown) for the deformable mirror 332e. A Micromachined Membrane Deformable Mirror (MMDM), of which the curvature and the concavities and convexities of the reflective surface can be modified may be used as the deformable mirror 332e.

9. Measuring Unit

Hereinafter, the measuring unit 333 in the optical device 330 will be described with examples.

9.1 Beam Profile Measurement at Two Points on Beam Delivery Path

Figure 20:
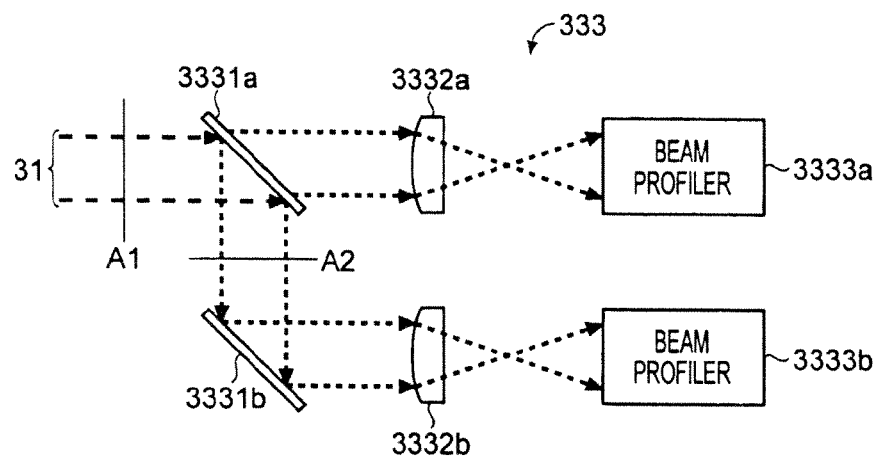
FIG. 20 illustrates an example of a measuring unit shown in FIG. 3.

FIG. 20 illustrates an example of the measuring unit 333. As illustrated in FIG. 20, the measuring unit 333 may include a beam splitter 3331a, a mirror 3331b, lenses 3332a and 3332b, and beam profilers 3333a and 3333b. A beam profile (cross-sectional intensity profile of the laser beam) of the pulsed laser beam 31 at a position A1 in the beam delivery path may be transferred on the photosensitive surface of the beam profiler 3333a by the lens 3332a. Meanwhile, a beam profile of the pulsed laser beam 31 at a position A2 in a branched beam delivery path may be transferred on the photosensitive surface of the beam profiler 3333b by the lens 3332b. In this way, measuring the beam profiles at a plurality of positions (A1 and A2, for example) distanced from each other may make it possible to calculate the direction, the divergence (curvature of the wavefront), and so forth, of the pulsed laser beam 31. For example, the spatial position and the direction of the beam delivery path may be calculated from the center positions in the beam profiles and the distance between the positions A1 and A2 in the beam delivery path. Further, the divergence (curvature of the wavefront) of the pulsed laser beam 31 may be calculated from the difference in size of the beam profiles at the positions A1 and A2. The spatial position and the direction of the beam delivery path may be expressed in three-dimensional coordinates.

9.2 Beam Profile and Beam Pointing

Figure 21:
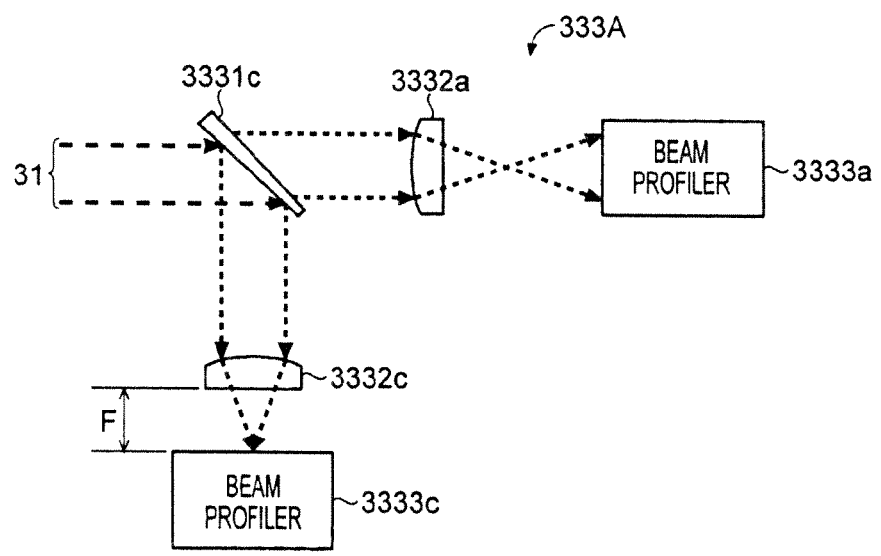
FIG. 21 illustrates another example of a measuring unit shown in FIG. 3.

The measuring unit 333 may be replaced by a measuring unit 333A shown in FIG. 21. As illustrated in FIG. 21, the measuring unit 333A may include a wedge-shaped beam splitter 3331c, lenses 3332a and 3332c, beam profilers 3333a and 3333c. As in the measuring unit 333, the lens 3332a and the beam profiler 3333a may be configured to measure the beam profile of the pulsed laser beam 31 transmitted through the wedge-shaped beam splitter 3331c. Meanwhile, the beam profiler 3333c may be disposed at the focus (F in FIG. 21) of the lens 3332c. The beam profiler 3333c may measure the beam profile of the pulsed laser beam 31 reflected by the wedge-shaped beam splitter 3331c at the focus of the pulsed laser beam 31. The spatial position and the direction of the beam delivery path of the pulsed laser beam 31 may be obtained from the center positions of the beam profile and the focal distance of the lens 3332c. Further, the divergence of the pulsed laser beam 31 may be obtained from the size of each beam profile and the position at which each beam profiler measures the beam profile.

9.3 Combination of Plate with Through-Hole and Beam Profiler

Figure 22:
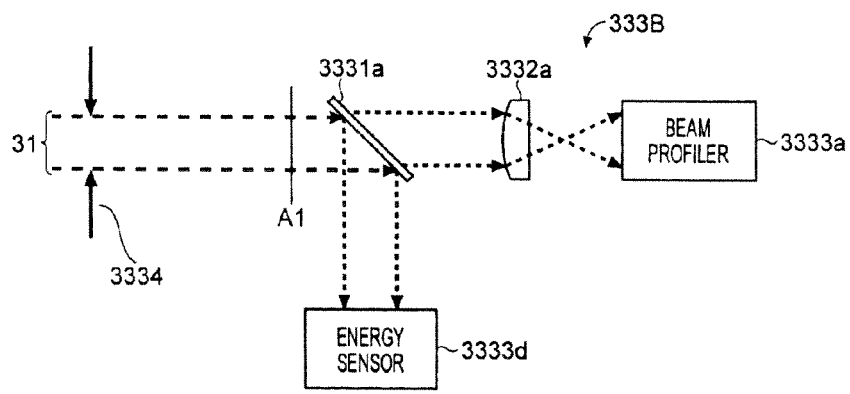
FIG. 22 illustrates another example of a measuring unit shown in FIG. 3.

The measuring unit 333 may be replaced by a measuring unit 333B shown in FIG. 22. As illustrated in FIG. 22, the measuring unit 333B may include a plate 3334 having a through-hole, the beam splitter 3331a, the lens 3332a, the beam profiler 3333a, and an energy sensor 3333d. The plate 3334 may be disposed such that the through-hole therein is located at a position that substantially differs from the position (position A1) at which the beam profile is to be measured. The beam profile of the pulsed laser beam 31, which has passed through the through-hole, at the position A1 in the beam delivery path may be transferred on the photosensitive surface of the beam profiler 3333a. When the spatial position and the size of the through-hole are known, the spatial position and the direction of the beam delivery path and further the divergence of the pulsed laser beam 31 may be obtained from the position and dimension of the through-hole and the beam profile obtained by the beam profiler 3333a. Further, the energy sensor 3333d may measure the energy of the pulsed laser beam 31 reflected by the beam splitter 3331a. Alternatively, the energy of the pulsed laser beam 31 may be calculated from the measurement result of the beam profile by the beam profiler 3333a.

Figure 23:
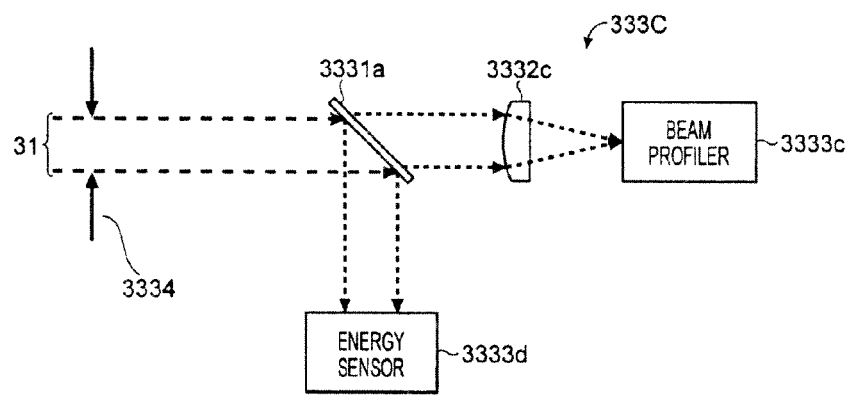
FIG. 23 illustrates another example of a measuring unit shown in FIG. 3.

The measuring unit 333 may be replaced by a measuring unit 333C shown in FIG. 23. The measuring unit 333C may be similar in configuration to the measuring unit 3333 shown in FIG. 22, but the lens 3332a and the beam profiler 3333a may be replaced respectively by the lens 3332c and the beam profiler 3333c. The beam profiler 3333c may measure the position and the size of the laser spot at the focus of the lens 3332c. As in the case shown in FIG. 22, when the spatial position and the size of the through-hole are known, the spatial position and the direction of beam delivery path and further the divergence of the pulsed laser beam 31 may be obtained from the position of the through-hole and the beam profile of the laser spot obtained by the beam profiler 3333c. Since the measuring unit 333C shown in FIG. 23 measures the position and the size of the laser spot at the focal point of the lens 3332c, the precision with which the direction of the beam delivery path may be improved, compared to the measuring unit 333B shown in FIG. 22. In FIG. 23, the pulsed laser beam 31 parallel with the optical axis of the lens 3332c focuses on the focal point. When the pulsed laser beam 31 does not focus on the focal point, it can be determined that the direction of the pulsed laser beam 31 deviates from the direction parallel with the optical axis. Here, the energy sensor 3333d may measure the energy of the pulsed laser beam 31 reflected by the beam splitter 3331a. Alternatively, the energy of the pulsed laser beam 31 may be calculated from the measurement result of the intensity distribution by the beam profiler 3333c.

9.4 Combination of Optical Module and Beam Profiler

Figure 24:
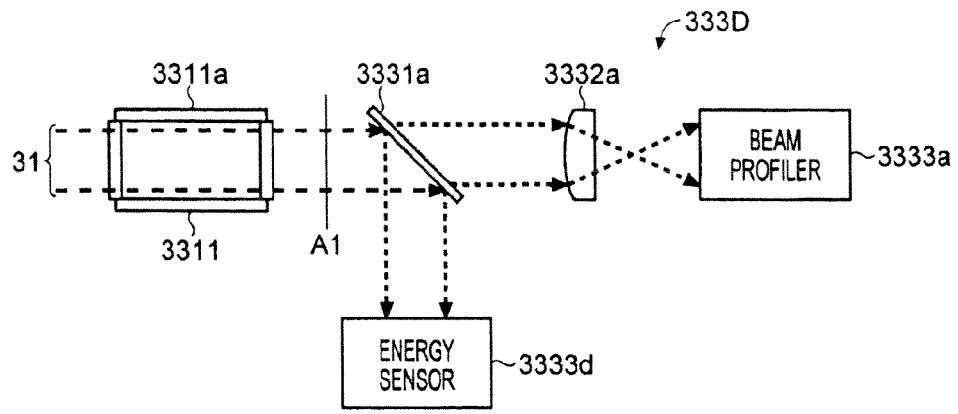
FIG. 24 illustrates another example of a measuring unit shown in FIG. 3.

The measuring unit 333 may be replaced by a measuring unit 333D shown in FIG. 24. As illustrated in FIG. 24, in the measuring unit 333D, the plate 3334 in the measuring unit 333B may be replaced by an amplifier 3311 including a discharge pipe 3311a. Even with such a configuration, a similar function to that of the measuring unit 333B may be achieved. Here, the inlet of the amplifier 3311 may be a through-hole so that the amplifier can be used like the plate 3334 having the through-hole (see FIGS. 22 and 23).

Figure 25:
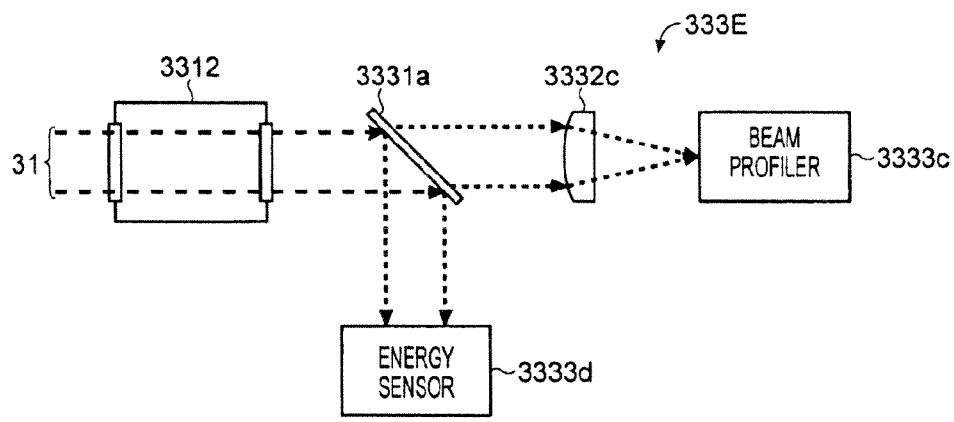
FIG. 25 illustrates another example of a measuring unit shown in FIG. 3.

The measuring unit 333 may be replaced by a measuring unit 333E shown in FIG. 25. As illustrated in FIG. 25, in the measuring unit 333E, the plate 3334 in the measuring unit 333C may be replaced by a saturable absorber cell 3312. Even with such a configuration, a similar function to that of the measuring unit 333C may be achieved. Here, the inlet of the saturable absorber cell 3312 may be a through-hole so that the amplifier can be used like the plate 3334 having the through-hole (see FIGS. 22 and 23).

9.5 Shack-Hartmann Interferometer

Figure 26:
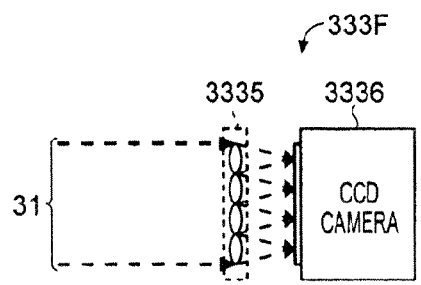
FIG. 26 illustrates another example of a measuring unit shown in FIG. 3.

The measuring unit 333 may be replaced by a measuring unit 333F shown in FIG. 26. As illustrated in FIG. 26, the measuring unit 333F may be a measuring unit of a Shack-Hartmann type. The measuring unit 333F may include a CCD camera 3336 and a microlens array 3335 disposed so as to face the photosensitive surface of the CCD camera 3336. With the Shack-Hartmann type measuring unit 333F, the direction of the beam delivery path and the divergence of the pulsed laser beam 31 may be detected with a single sensor.

10. Control Unit

Hereinafter, the operation of the control unit 334 in the optical device 330 will be described with examples.

10.1 Control Flow in Control Unit

Figure 27:
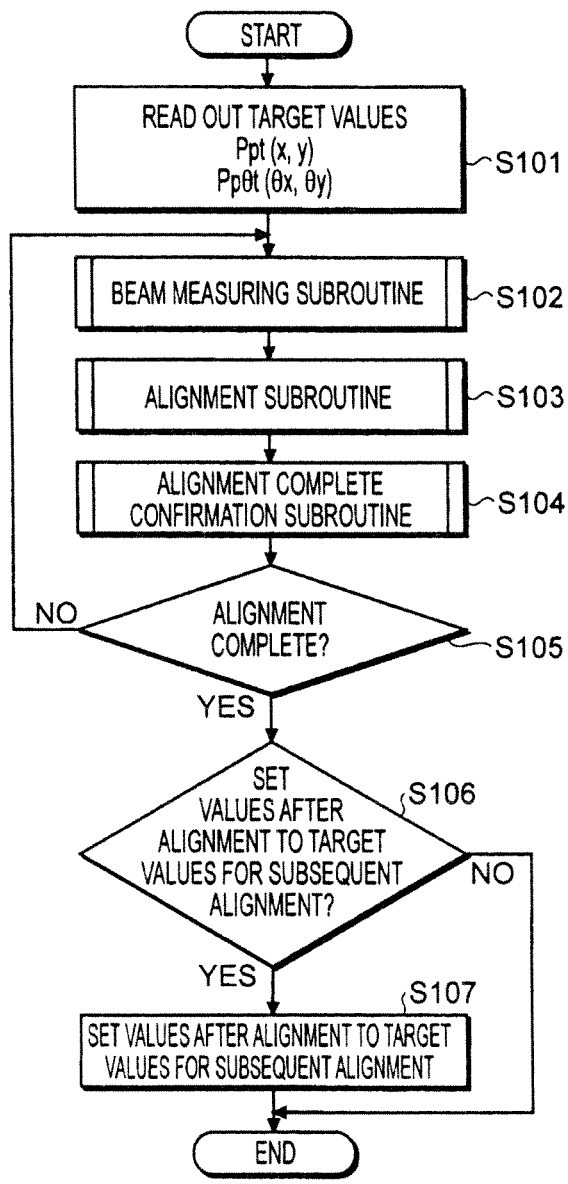
FIG. 27 is a flowchart showing the general operation of a control unit shown in FIG. 3.

FIG. 27 is a flowchart showing the general operation of the control unit 334. As illustrated in FIG. 27, when the alignment operation is started, the control unit 334 may first read out target values stored in advance in a memory or the like (not shown) (Step S101). Here, the target values may include a beam profile measured by the measuring unit 333 when the beam delivery path is in a desired state, the spatial position and the direction of the beam delivery path obtained from the beam profile, and so forth. In this example, a target position Ppt (x, y) and a target direction Ppθt (θx, θy) of the beam delivery path of the pulsed laser beam 31 may serve as the target values. As discussed above, the target position and target direction are determined in three-dimensional coordinates. In this example, the Z-direction is fixed.

Then, the control unit 334 may execute a beam measuring subroutine for measuring the beam profile of the pulsed laser beam 31 (Step S102), and execute an alignment subroutine for aligning the beam delivery path of the pulsed laser beam 31 by driving the beam adjusting unit 332 in the optical device 330 based on the measured beam profile (Step S103). Thereafter, the control unit 334 may execute an alignment complete confirmation subroutine for confirming that the alignment is complete (Step S104) and determine whether the alignment is complete (Step S105).

Based on the result of the determination in Step S105, when the alignment is not complete (Step S105; NO), the control unit 334 may return to Step S102 and repeat the subsequent steps. Meanwhile, when the alignment is complete (Step S105; YES), the control unit 334 may determine whether a position Pp (x, y) and a direction Ppθ (Δx, θy) of the beam delivery path obtained from the values measured by the measuring unit 333 after the alignment are set to the target values for subsequent alignment (Step S106). The determination may be based on the number of alignment operations. For example, the target values may be updated for every alignment operation, or once for every predetermined number of alignment operation (for example, every other alignment operation).

Based on the determination result in Step S106, when the values after the alignment are set to the target values (Step S106; YES), the control unit 334 may overwrite the target values in the memory with these new values (Step S107) and terminate the processing. Meanwhile, when the values after the alignment are not to be set to the target values (Step S106; NO), the control unit 334 may terminate the processing.

Figure 28:
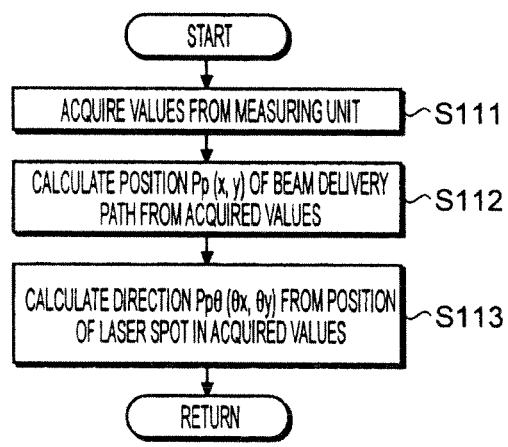
FIG. 28 shows a beam measuring subroutine in Step S102 of FIG. 27.

In the beam measuring subroutine in Step S102 of FIG. 27, as illustrated in FIG. 28, the control unit 334 may acquire values measured by the measuring unit 333 (Step S111). Here, the measuring unit 333 may be continuously measuring the beam profiles of the pulsed laser beam 31. Then, the control unit 334 may calculate the position Pp (x, y) of the beam delivery path from the acquired values (Step S112) and calculate the direction Ppθ (θx, θy) of the beam delivery path from the position of the laser spot in the acquired value (Step S113). Thereafter, the control unit 334 may return to the operation shown in FIG. 27.

10.2 Variations of Control Flow

Figure 29:
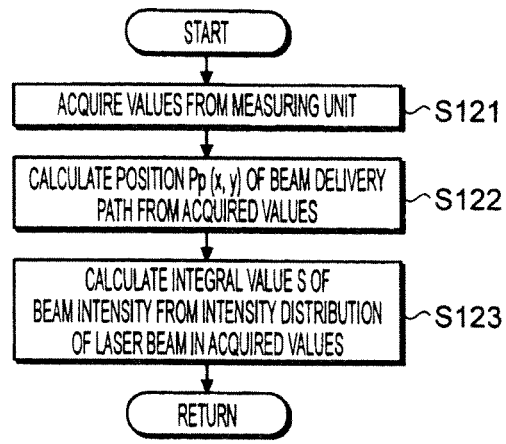
FIG. 29 shows a beam measuring subroutine where the measuring unit shown in FIG. 22 is used.
Figure 30:
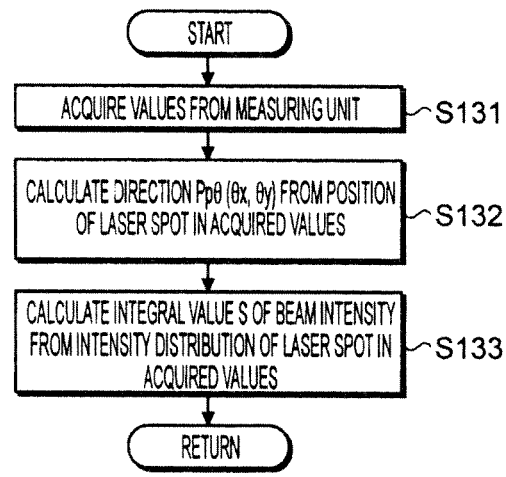
FIG. 30 shows a beam measuring subroutine where the measuring unit shown in FIG. 23 is used.

The beam measuring subroutine shown in FIG. 28 may be modified as in a flow shown in FIG. 29 or 30, when the measuring unit 333B, 333C, 333D, or 333E, respectively illustrated in FIGS. 22, 23, 24, and 25 is used. FIG. 29 shows a beam measuring subroutine when the measuring unit 333B or 333D is used. FIG. 30 shows a beam measuring subroutine when the measuring unit 333C or 333E is used.

In the operation shown in FIG. 29, the control unit 334 may acquire value measured by the measuring unit 333B or 333D (Step S121), and calculate the position Pp (x, y) of the beam delivery path from the acquired values (Step S122). Further, the control unit 334 may calculate an integral value S of the beam intensity from the intensity distribution of the pulsed laser beam 31 (Step S123). Thereafter, the control unit 334 may return to the operation shown in FIG. 27. In this case, in place of the target direction Ppθt (θx, θy), a target integral value St may be used as one of the target values.

In the operation shown in FIG. 30, the control unit 334 may acquire values measured by the measuring unit 333C or 333E (Step S131), and calculate the direction Ppθ (θx, θy) from the position of the laser spot in the acquired values (Step S132). Then, the control unit 334 may calculate the integral value S of the beam intensity from the intensity distribution of the laser spot (Step S133). Thereafter, the control unit 334 may return to the operation shown in FIG. 27. In this case, in place of the target position Ppt (x, y), the target integral value St may be used as one of the target values.

In the operation shown in FIGS. 29 and 30, in place of the integral value S of the beam intensity, a value measured by the energy sensor 3333d may be used.

Figure 31:
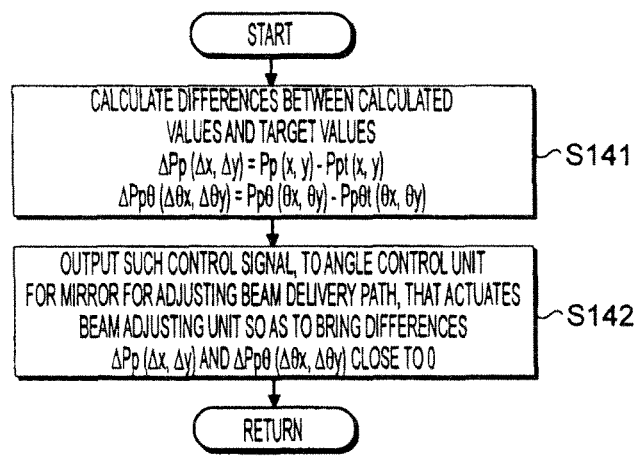
FIG. 31 shows an alignment subroutine in Step S103 of FIG. 27.

FIG. 31 shows the alignment subroutine shown in Step S103 of FIG. 27. Here, FIG. 31 shows a case where the beam measuring subroutine shown in FIG. 28 is employed. As illustrated in FIG. 31, the control unit 334 may calculate differences between the values calculated in the beam measuring subroutine and the target values (Step S141). These differences may include a difference ΔPp (Δx, Δy) (=Pp (x, y)−Ppt (x, y)) in position and a difference ΔPpθ (Δθx, Δθy) (=Ppθ(θx, θy)−Ppθt (θx, θy)) in direction. Subsequently, the control unit 334 may output, to an angle control unit (such as the holder 332c) for a mirror for adjusting the beam delivery path (such as the mirror 332a or 332b) in the beam adjusting unit 332, such a control signal that actuates the beam adjusting unit so as to bring the differences ΔPp (Δx, $\Delta y$) and $\Delta Pp\theta$ ($\Delta x$, $\Delta \theta y$) close to 0 (Step S142). In response to the control signal, the beam adjusting unit 332 may be actuated, whereby the beam delivery path of the pulsed laser beam 31 may be adjusted to a target beam delivery path.

Figure 32:
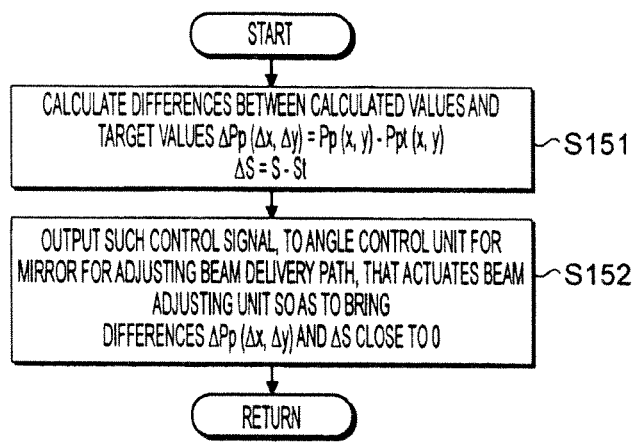
FIG. 32 shows an alignment subroutine where the measuring unit shown in FIG. 22 is used.

When the beam measuring subroutine shown in FIG. 29 is employed, as illustrated in FIG. 32, in the alignment subroutine, the control unit 334 may calculate differences between the values calculated in the beam measuring subroutine and the target values (Step S151). These differences may include the difference $\Delta Pp$ ($\Delta x$, $\Delta y$) in position and a difference $\Delta S$(=S−St) in integral value. Subsequently, the control unit 334 may output, to the angle control unit for the mirror for adjusting the beam delivery path in the beam adjusting unit 332, such a control signal that actuates the beam adjusting unit so as to bring the differences $\Delta Pp$ ($\Delta x$, $\Delta y$) and $\Delta S$ close to 0 (Step S152). In response to the control signal, the beam adjusting unit 332 may be actuated, whereby the beam delivery path of the pulsed laser beam 31 may be adjusted to the target beam delivery path.

Figure 33:
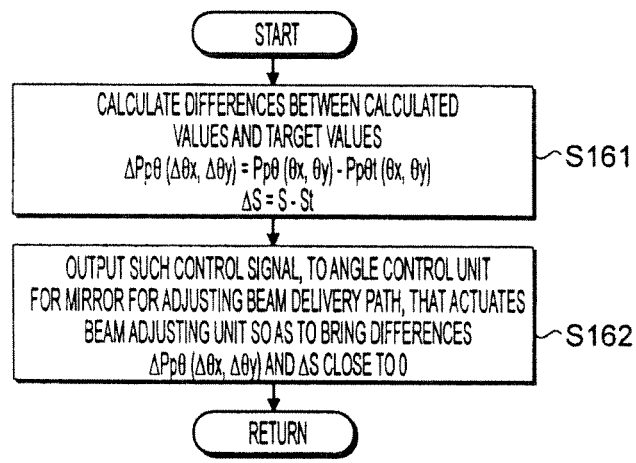
FIG. 33 shows an alignment subroutine where the measuring unit shown in FIG. 23 is used.

When the beam measuring subroutine shown in FIG. 30 is employed, as illustrated in FIG. 33, in the alignment subroutine, the control unit 334 may calculate differences between the values calculated in the beam measuring subroutine and the target values (Step S161). These differences may include the difference $\Delta Pp\theta$ ($\Delta \theta x$, $\Delta \theta y$) (=Pp$\theta$($\theta x$, $\theta y$)−Pp$\theta t$($\theta x$, $\theta y$)) in direction and the difference $\Delta S$ in integral value. Subsequently, the control unit 334 may output, to the angle control unit for the mirror for adjusting the beam delivery path in the beam adjusting unit 332, such a control signal that actuates the beam adjusting unit so as to bring the differences $\Delta Pp\theta$ ($\Delta \theta x$, $\Delta \theta y$) and $\Delta S$ close to 0 (Step S162). In response to the control signal, the beam adjusting unit 332 may be actuated, whereby the beam delivery path of the pulsed laser beam 31 may be adjusted to the target beam delivery path.

Figure 34:
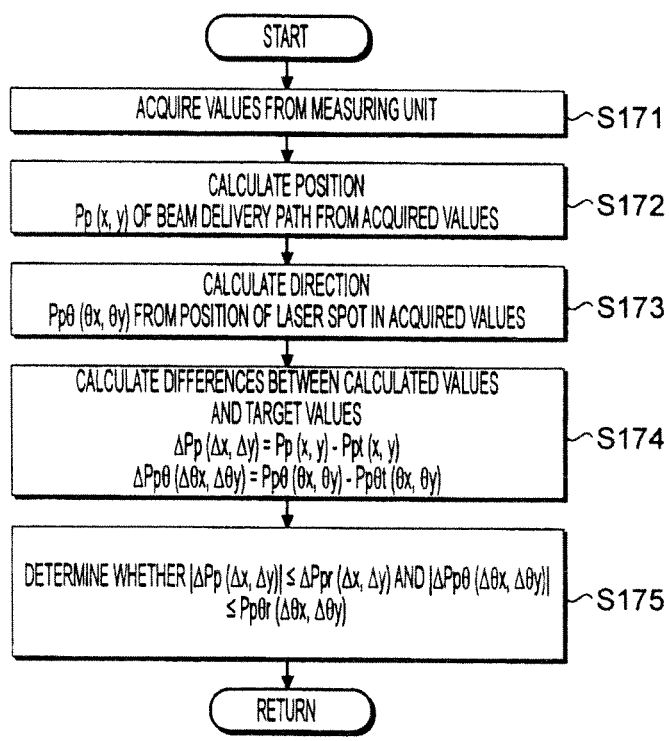
FIG. 34 shows an alignment complete confirmation subroutine in Step S104 of FIG. 27.

FIG. 34 shows the alignment complete confirmation subroutine in Step S104 of FIG. 27. Here, FIG. 34 shows a case where the beam measuring subroutine shown in FIG. 28 is employed. As illustrated in FIG. 34, the control unit 334 may acquire values measured by the measuring unit 333 after the alignment in Step S103 of FIG. 27 is carried out (Step S171). Then, the control unit 334 may calculate the position Pp (x, y) of the beam delivery path after the alignment from the acquired values (Step S172) and calculate the direction Pp$\theta$ ($\theta x$, $\theta y$) of the beam delivery path after the alignment from the position of the laser spot in the acquired values (Step S173). Subsequently, the control unit 334 may calculate the difference $\Delta Pp$ ($\Delta x$, $\Delta y$) between the position Pp (x, y) of the beam delivery path after the alignment and the target value Ppt (x, y) and the difference $\Delta Pp\theta$ ($\Delta \theta x$, $\Delta \theta y$) between the direction Pp$\theta$ ($\theta x$, $\theta y$) and the target value Pp$\theta t$ ($\theta x$, $\theta y$) (Step S174). Further, the control unit 334 may determine whether the absolute values of the differences $\theta Pp$ ($\Delta x$, $\Delta y$) and $\Delta Pp\theta$ ($\theta x$, $\Delta \theta y$) are equal to or less than preset acceptable values $\Delta Ppr$ ($\Delta x$, $\Delta y$) and $\Delta Pp\theta r$ ($\Delta \theta x$, $\Delta \theta y$) (Step S175). In Step S105 in FIG. 27, when the absolute values of the differences $\theta Pp$ ($\Delta x$, $\Delta y$) and $\Delta Pp\theta$ ($\Delta \theta x$, $\Delta \theta y$) are equal to or less than the acceptable values $\Delta Ppr$ ($\Delta x$, $\Delta y$) and $\Delta Pp\theta r$ ($\Delta \theta x$, $\Delta \theta y$), the control unit 334 may determine that the alignment is complete (Step S105; YES).

Figure 35:
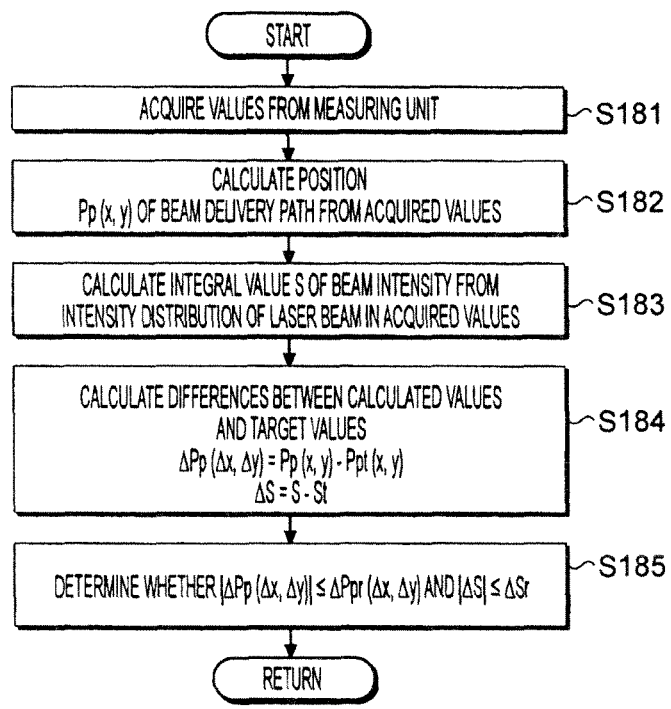
FIG. 35 shows an alignment complete confirmation subroutine where the measuring unit shown in FIG. 22 is used.

When the beam measuring subroutine shown in FIG. 29 is employed, as illustrated in FIG. 35, in the alignment complete confirmation subroutine, the control unit 334 may acquire the values measured by the measuring unit 333 after the alignment in Step S103 of FIG. 27 is carried out (Step S181). Then, the control unit 334 may calculate the position Pp (x, y) of the beam delivery path after the alignment from the acquired values (Step S182) and calculate the integral value S of the beam intensity of the pulsed laser beam 31 after the alignment from the intensity distribution of the pulsed laser beam 31 in the acquired values (Step S183). Subsequently, the control unit 334 may calculate the difference $\theta Pp$ ($\Delta x$, $\Delta y$) between the position Pp (x, y) of the beam delivery path after the alignment and the target value Ppt (x, y) and the difference $\Delta S$ between the integral value S and the target integral value St (Step S184) Further, the control unit 334 may determine whether the absolute values of the differences $\Delta Pp$ ($\Delta x$, $\Delta y$) and $\Delta S$ are equal to or less than preset acceptable values $\Delta Ppr$ ($\Delta x$, $\Delta y$) and $\Delta Sr$ (Step S185) In Step S105 of FIG. 27, when the absolute values of the differences $\Delta Pp$ ($\Delta x$, $\Delta y$) and $\Delta S$ are equal to or less than the acceptable values $\Delta Ppr$ ($\Delta x$, $\Delta y$) and $\Delta Sr$, the control unit 334 may determine that the alignment is complete (Step S105; YES)

Figure 36:
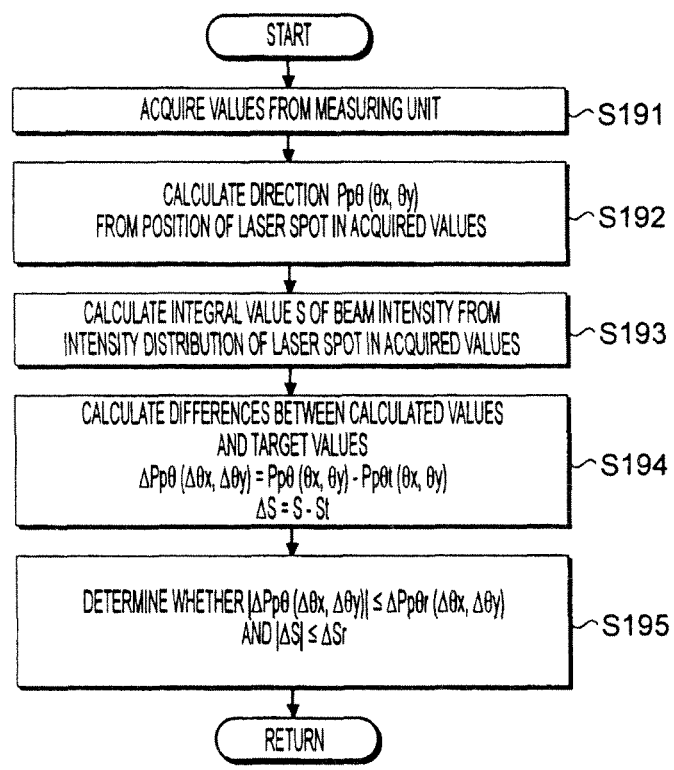
FIG. 36 shows an alignment complete confirmation subroutine where the measuring unit shown in FIG. 23 is used.

When the beam measuring subroutine shown in FIG. 30 is employed, as illustrated in FIG. 36, in the alignment complete confirmation subroutine, the control unit 334 may acquire the values measured by the measuring unit 333 after the alignment in Step S103 of FIG. 27 is carried out (Step S191). Then, the control unit 334 may calculate the direction Pp$\theta$ ($\theta x$, $\theta y$) of the beam delivery path after the alignment from the position of the laser spot in the acquired values (Step S192) and calculate the integral value S of the beam intensity of the pulsed laser beam 31 after the alignment from the intensity distribution of the laser spot in the acquired values (Step S193). Subsequently, the control unit 334 may calculate the difference $\Delta Pp\theta$ ($\Delta \theta x$, $\Delta \theta y$) between the direction Pp$\theta$ ($\Delta x$, $\theta y$) of the beam delivery path after the alignment and the target value Pp$\theta t$ ($\theta x$, $\theta y$), and the difference $\Delta S$ between the integral value S and the target value St (Step 194), and may determine whether the absolute values of the difference $\Delta Pp\theta$ ($\Delta \theta x$, $\Delta \theta y$) and the difference $\Delta S$ are equal to or less than preset acceptable values $\Delta Pp\theta r$ ($\Delta \theta x$, $\Delta \theta y$) and $\Delta Sr$ (Step S195). In Step S105 of FIG. 27, when the absolute values of the differences $\Delta Pp\theta$ ($\Delta \theta x$, $\Delta \theta y$) and $\theta S$ are equal to or less than the acceptable values $\Delta Pp\theta r$ ($\Delta \theta x$, $\Delta \theta y$) and $\Delta Sr$, the control unit 334 may determine that the alignment is complete (Step S105; YES)

11. Lpp Type EUV Light Generation System

Figure 37:
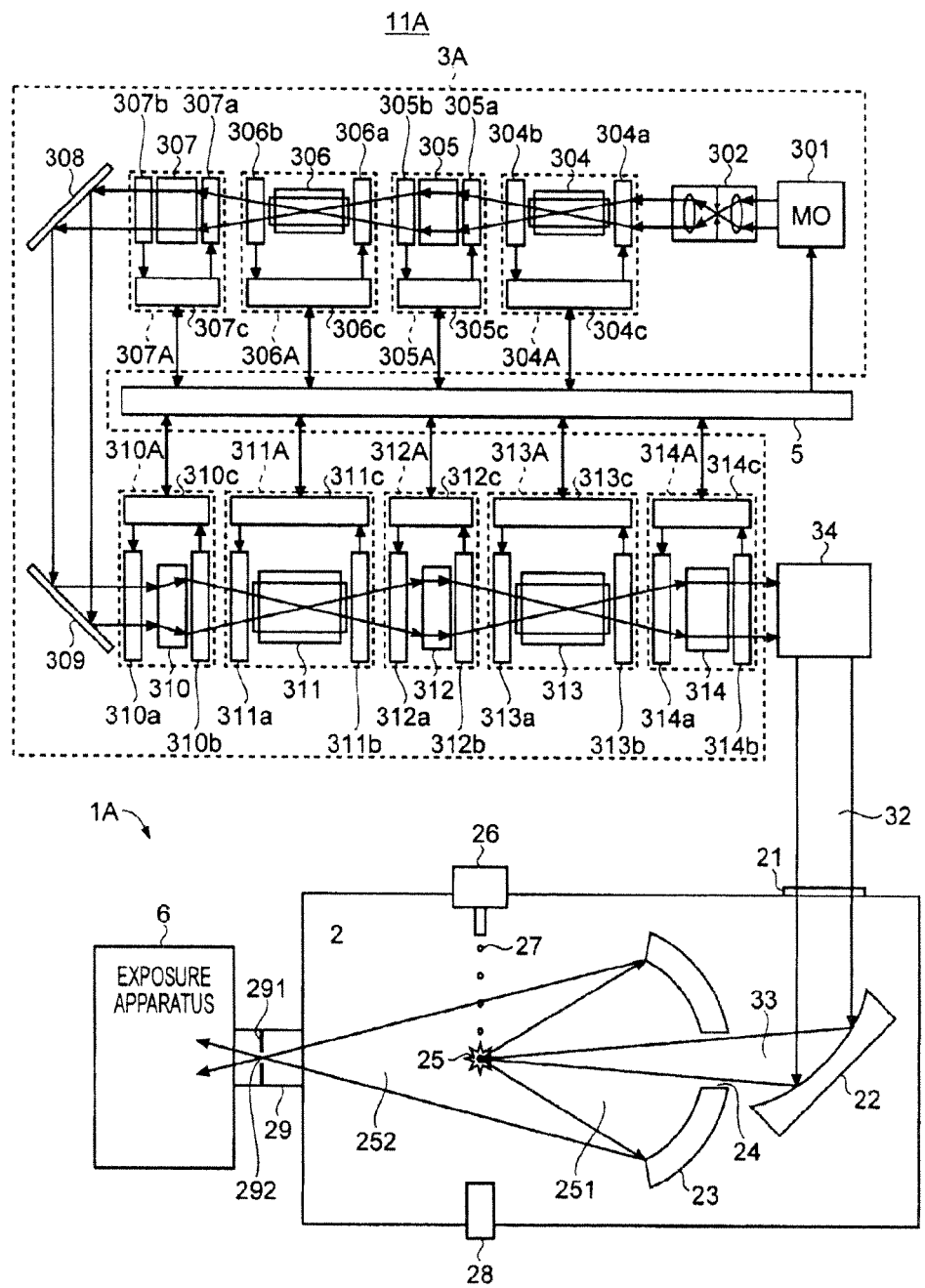
FIG. 37 schematically illustrates the configuration of an EUV light generation system in which an optical device according to an embodiment is applied.

A case where the above-described optical devices are applied to the laser apparatus 3 of the EUV light generation system 11 (see FIG. 2) will be described below. FIG. 37 schematically illustrates the configuration of an EUV light generation system 11A to which the above-described optical devices are applied. Note that the target sensor 4 shown in FIG. 1 is omitted in FIG. 37 for brevity.

11.1 Configuration

In a laser apparatus 3A illustrated in FIG. 37, optical devices 304A through 307A and 310A through 314A may respectively include the optical modules 304 through 307 and 310 through 314, beam adjusting units 304a through 307a and 310a through 314a, measuring units 304b through 307b and 310b through 314b, and control units 304c through 307c and 310c through 314c. The EUV light generation controller 5 may entirely control the control units 304c through 307c and 310c through 314c in the respective optical devices 304A through 307A and 310A through 314A. The control units 304c through 307c and 310c through 314c may each independently carry out the above-described alignment operation automatically with the orders given by the EUV light generation controller 5 as triggers. Further, the control units 304c through 307c and 310c through 314c may each send an alignment complete signal to the EUV light generation controller 5 when the alignment in the respective optical devices 304A through 307A and 310A through 314A is complete.

11.2 Control Flow of Laser Controller

Figure 38:
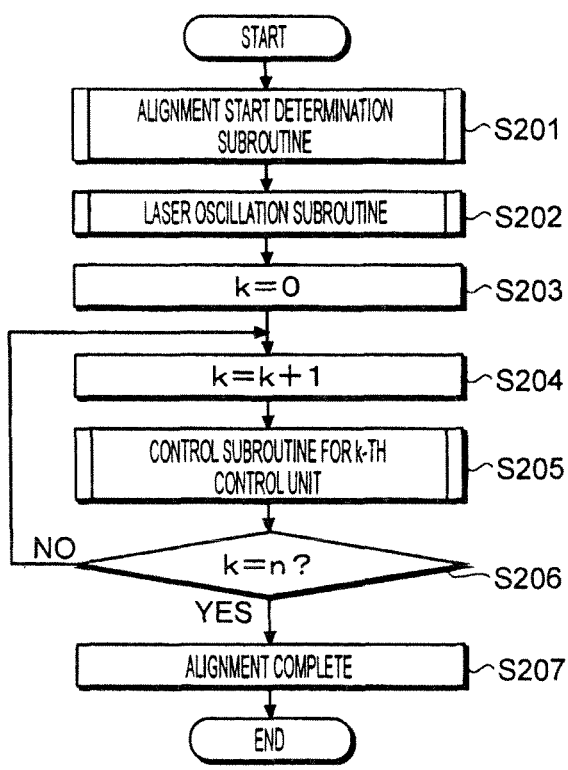
FIG. 38 shows the operation of the EUV light generation controller shown in FIG. 37.

The operation of the EUV light generation controller 5 shown in FIG. 37 will be described with examples. FIG. 38 is a flowchart showing the operation of the EUV light generation controller 5. In the description to follow, the number of optical devices in which the alignment is carried out is designated by n. Further, the optical device on the side of the master oscillator 301 is designated as a first optical device, and the optical device closest to the chamber 2 is designated as an n-th optical device. Further, the order in which the alignment is carried out is described as ordinal number indicated by n. However, when maintenance work is performed on an optical device positioned midway in the beam delivery path, only the optical device on which the maintenance work is performed and the optical devices downstream therefrom may be aligned.

As illustrated in FIG. 38, the EUV light generation controller 5 may execute an alignment start determination subroutine for determining whether the alignment is required (Step S201). In the alignment start determination subroutine, when it is determined that the alignment is required, the EUV light generation controller 5 may execute a laser oscillation subroutine for oscillating the master oscillator 301 (Step S202). The EUV light generation controller 5 may perform the alignment start determination subroutine every time the controller is activated.

Then, the EUV light generation controller 5 may reset a value k (k=0) in a counter (not shown) (Step S203), and increment the counter by 1 (k=k+1) (Step S204). Subsequently, the EUV light generation controller 5 may execute a control subroutine for carrying out the alignment on a k-th optical device (Step S205)

Thereafter, the EUV light generation controller 5 may determine whether the value k in the counter has reached n (k=n) (Step S206), and when k has not reached n (Step S206; NO), the EUV light generation controller 5 may return to Step S204 and carry out the alignment on the subsequent optical device. Meanwhile, when k has reached n (Step S206; YES), the EUV light generation controller 5 my complete the alignment (Step S207) and terminate the processing.

Figure 39:
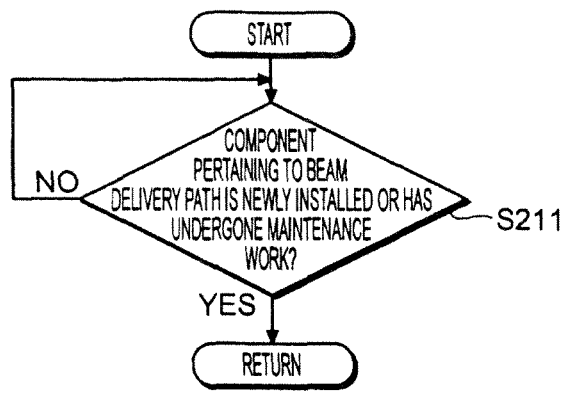
FIG. 39 shows an alignment start determination subroutine in Step S201 of FIG. 38.

In the alignment start determination subroutine in Step S201 of FIG. 38, as illustrated in FIG. 39, the EUV light generation controller 5 may determine whether components required to be aligned with respect to the beam delivery path in the laser apparatus 3A have been newly installed or undergone maintenance work (Step S211), and wait until a component is newly installed or undergoes maintenance work (Step S211; NO). Meanwhile, when a component is newly installed or has undergone maintenance work (Step S211; YES), the EUV light generation controller 5 may return to the operation shown in FIG. 38.

Figure 40:
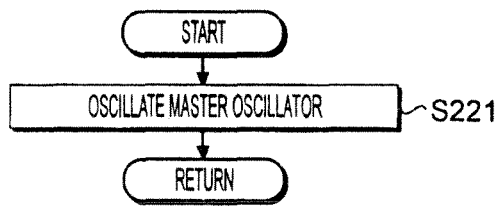
FIG. 40 shows a laser oscillation subroutine in Step S202 of FIG. 38.

In the laser oscillation subroutine in Step S202 of FIG. 38, as illustrated in FIG. 40, the EUV light generation controller 5 may control the master oscillator 301 to start oscillating (Step S221) and return to the operation shown in FIG. 38. With this, a pulsed laser beam outputted from the master oscillator 301 may be introduced into the beam delivery path from the master oscillator 301 to the plasma generation region 25. Here, the EUV light generation controller 5 may continue outputting oscillation triggers to the master oscillator 301 at a predetermined repetition rate from the start of the oscillation of the master oscillator 301 until the EUV light generation controller 5 receives an instruction to stop the oscillation of the master oscillator 301 from an external apparatus.

Figure 41:
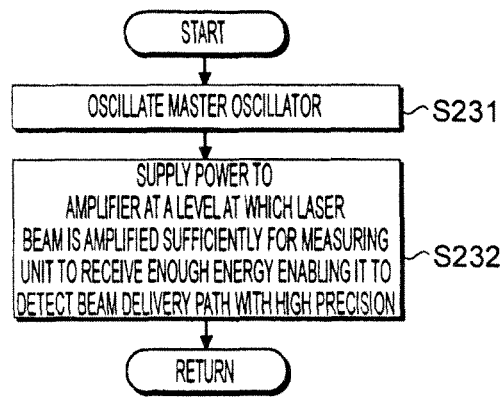
FIG. 41 shows another mode of a laser oscillation subroutine in Step S202 of FIG. 38.

A laser oscillation subroutine shown in FIG. 41 may be employed as the laser oscillation subroutine in Step S202 of FIG. 38. In the operation shown in FIG. 41, the EUV light generation controller 5 may control the master oscillator 301 to start oscillating (Step S231), then supply power to at least one of the amplifiers 304, 306, 311, and 313 (Step S232), and thereafter return to the operation shown in FIG. 38. Here, the power supplied to at least one of the amplifiers 304, 306, 311, and 313 may preferably be at a level at which the pulsed laser beam 31 can be amplified sufficiently for the measuring units 304b through 307b and 310b through 314b to receive enough energy that enables them to detect the beam delivery path with high precision.

The control subroutine on the individual optical device in Step S205 of FIG. 38 may be similar to the alignment operation described with reference to FIGS. 27 through 36, for example. Here, the operations shown in FIGS. 42 through 44 may be employed, respectively, as the beam measuring subroutine in Step S102, the alignment subroutine in Step S103, and the alignment complete confirmation subroutine in Step S104 of FIG. 27. Further, when the divergence is to be corrected, the beam adjusting unit 332A or 332B shown in FIGS. 17 through 19 may be employed as the beam adjusting unit.

Figure 42:
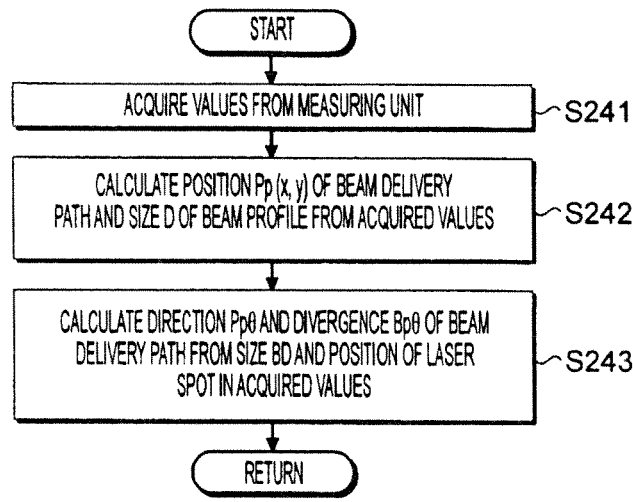
FIG. 42 shows a beam measuring subroutine executed by the control unit of the optical device shown in FIG. 37.

In the beam measuring subroutine shown in FIG. 42, the control unit 334 may acquire values measured by the measuring unit 333 (Step S241), and calculate the position Pp (x, y) of the beam delivery path and a size D of the beam profile from the acquired values (Step S242). Further, the control unit 334 may calculate the direction Pp$\theta$ and the divergence Bp$\theta$ of the beam delivery path from the size BD and the position of the laser spot in the acquired values (Step S243). Thereafter, the control unit 334 may return to the operation shown in FIG. 27. In this case, the target position Ppt (x, y), the target direction Pp$\theta$t ($\theta$x, $\theta$y), and the target divergence Bp$\theta$t may be used as the target values.

Figure 43:
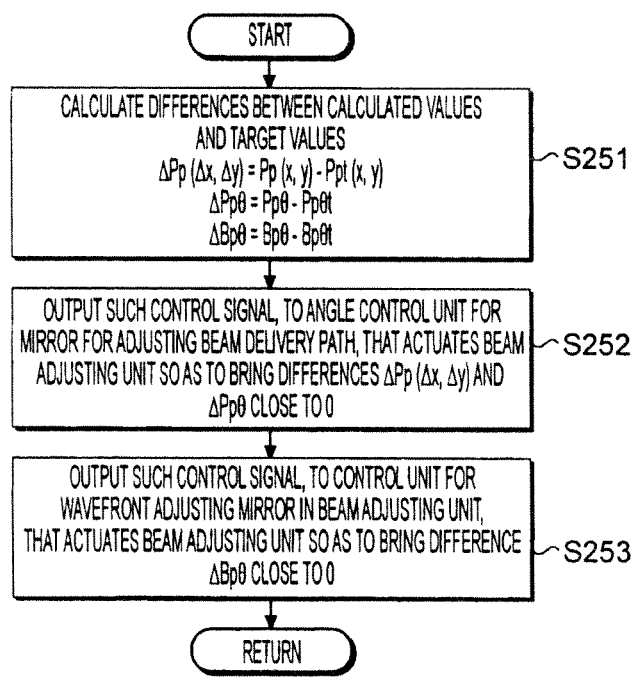
FIG. 43 shows an alignment subroutine executed by the control unit of the optical device shown in FIG. 37.

When the beam measuring subroutine shown in FIG. 42 is employed, as illustrated in FIG. 43, in the alignment subroutine, the control unit 334 may calculate differences between the values calculated in the beam measuring subroutine and the target values (Step S251). These differences may include the difference $\theta$Pp ($\Delta$x, $\Delta$y) in position, the difference $\Delta$Pp$\theta$ ($\Delta\theta$x, $\Delta\theta$y) in direction, and the difference $\Delta$Bp$\theta$ in divergence. Subsequently, the control unit 334 may output a control signal to an angle control unit for the mirror for adjusting the beam delivery path in the beam adjusting unit 332A. The control signal can actuate the beam adjusting unit 332A so as to bring the differences $\theta$Pp ($\Delta$x, $\Delta$y) and $\Delta$Pp$\theta$ close to 0, for example (Step S252). Then, the control unit 334 may output a control signal to the control unit for a wavefront adjusting mirror in the beam adjusting unit 332A (beam adjusting unit capable of adjusting wavefront). The control signal can actuate the beam adjusting unit so as to bring the difference $\Delta$Bp$\theta$) close to 0 (Step S253). In response to these control signals, the beam adjusting unit 332A may be actuated, whereby the beam delivery path of the pulsed laser beam 31 may be adjusted to the target beam delivery path.

Figure 44:
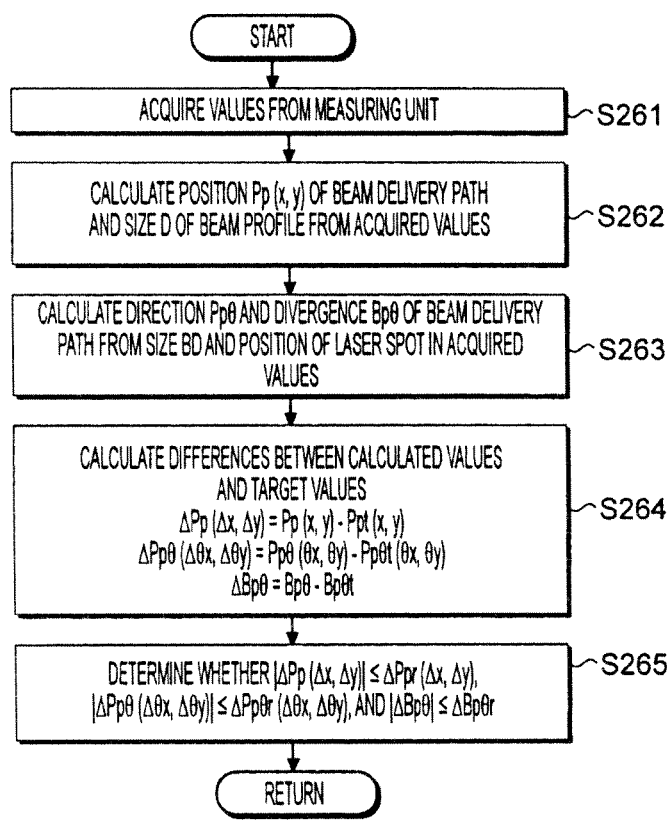
FIG. 44 shows an alignment complete confirmation subroutine executed by the control unit of the optical device shown in FIG. 37.

When the beam measuring subroutine shown in FIG. 42 is employed, the alignment complete confirmation subroutine may be as shown in FIG. 44. In the operation shown in FIG. 44, the control unit 334 may acquire values measured by the measuring unit 333 after the alignment in Steps S103 of FIG. 27 is carried out (Step S261). Then, the control unit 334 may calculate the position Pp (x, y) of the beam delivery path and the size D of the beam profile after the alignment from the acquired values (Step S262), and calculate the direction Pp$\theta$ and the divergence Bp$\theta$ of the beam delivery path after the alignment from the size BD and the position of the laser spot in the acquired values (Step S263). Subsequently, the control unit 334 may calculate the difference $\Delta$Pp ($\Delta$x, $\Delta$y) between the position Pp (x, y) of the beam delivery path after the alignment and the target value Ppt (x, y), the difference ΔPpθ (Δθx, Δθy) between the direction Ppθ (θx, θy) and the target value Ppθt (θx, θy), and the difference ΔBpθ between the divergence Bpθ and the target divergence Bpθt (Step S264). Then, the control unit 334 may determine whether the absolute values of the differences θPp (Δx, Δy), ΔPpθ (Δθx, Δθy), and ΔBpθ are equal to or less than the preset acceptable values ΔPpr (Δx, Δy), ΔPpθr (Δθx, Δθy), and ΔBpθr (Step S265). Thereafter, the control unit 334 may return to Step S105 of FIG. 27. In Step S105 of FIG. 27, when the absolute values of the differences ΔPp (Δx, Δy), ΔPpθ (Δθx, Δθy), and ΔBpθ are equal to or less than the acceptable values ΔPpr (Δx, Δy), ΔPpθr (Δθx, Δθy), and ΔBpθr, the control unit 334 may determine that the alignment is complete (Step S105; YES).

Figure 45:
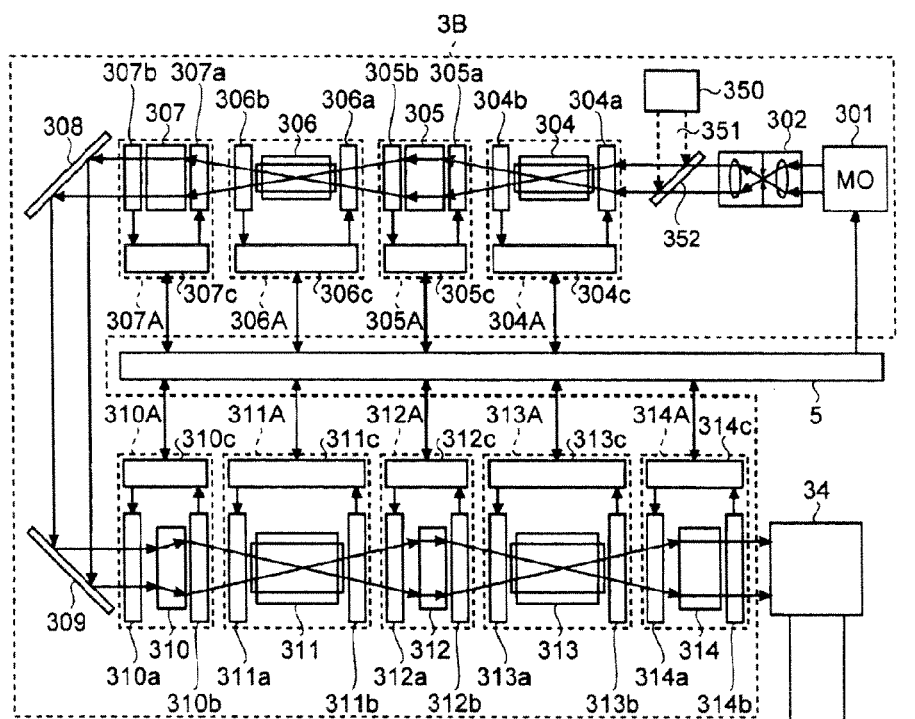
FIG. 45 schematically illustrates the configuration of an EUV light generation system according to another embodiment, in which alignment of the optical device is carried out by using a guide laser beam.
Figure 45:
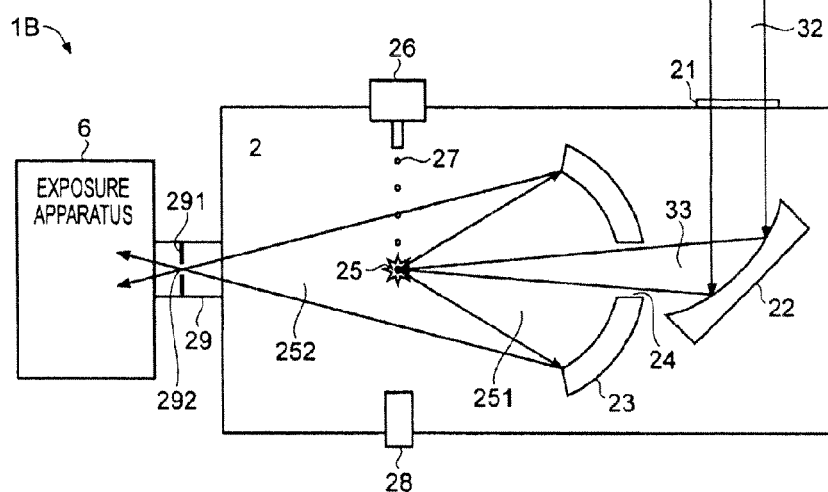

12. Laser Apparatus Including Guide Laser Apparatus and EUV Light Generation System A guide laser beam may be used for the alignment in the optical devices. FIG. 45 schematically illustrates the configuration of an EUV light generation system 11B, in which the alignment in the optical devices can be carried out using a guide laser beam. Note that the target sensor 4 shown in FIG. 1 is omitted in FIG. 45 for brevity.

12.1 Configuration

As may be apparent when FIGS. 37 and 45 are compared with each other, a laser apparatus 3B of the EUV light generation system 11B may further include a guide laser apparatus 350 capable of outputting a guide laser beam. A guide laser beam 351 outputted from the guide laser apparatus 350 may be introduced into a beam delivery path substantially coinciding with the beam delivery path of the pulsed laser beam 31 outputted from the spatial filter 302 by a dichroic mirror functioning as a beam delivery path combining unit 352, for example. The guide laser beam 351 may be a laser beam at a wavelength that is highly sensitive to a sensor such as a beam profiler in the measuring unit 333, for example. A YAG laser or a fiber laser capable of outputting a laser beam at a wavelength of approximately 1 μm, for example, may be used as the guide laser apparatus 350. Further, the guide laser beam 351 may be visible light. In this case, a HeNe laser (633 nm), or a YAG laser (the second harmonic (533 nm)) may be used as the guide laser apparatus 350.

12.2 Control Flow of Laser Controller

Figure 46:
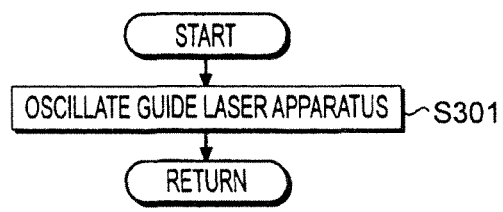
FIG. 46 shows a laser oscillation subroutine executed by the EUV light generation controller shown in FIG. 45.

The operation of the EUV light generation controller 5 shown in FIG. 45 may basically be similar to the operation of the EUV light generation controller 5 shown in FIG. 37. However, the EUV light generation controller 5 shown in FIG. 45 may control the guide laser apparatus 350 to oscillate (refer to Step S301 of FIG. 46), instead of the master oscillator 301, at the time of alignment operation in the optical devices (Step S202 of FIG. 38). The alignment in the optical devices may be carried out based on values obtained by measuring the guide laser beam 351.

In this way, with the configuration in which the guide laser beam 351 is used, a laser beam at a wavelength (200 nm to 5000 nm, for example) that is highly sensitive to a semiconductor optical sensor used as a beam profiler, an energy sensor, or the like, can be used for the alignment. With this, the beam delivery path of the guide laser beam 351 may be detected with high precision. As a result, the alignment can be carried out in the optical devices with high precision. Further, the pulsed laser beam 31 by which the target is to be irradiated may not need to be outputted for the alignment; thus, the alignment can be carried out under a safe condition.

13. Positioning Mechanism

Installation examples of the EUV light generation system will be described. In the description to follow, the EUV light generation system 11A shown in FIG. 37 will be cited. However, the master oscillator 301 and the spatial filter 302 may be configured as optical devices each including the beam adjusting unit 332, the measuring unit 333, and the control unit 334. Further, in this example, the optical device 330B shown in FIGS. 7 and 8 will be employed as an amplifier.

Figure 47:
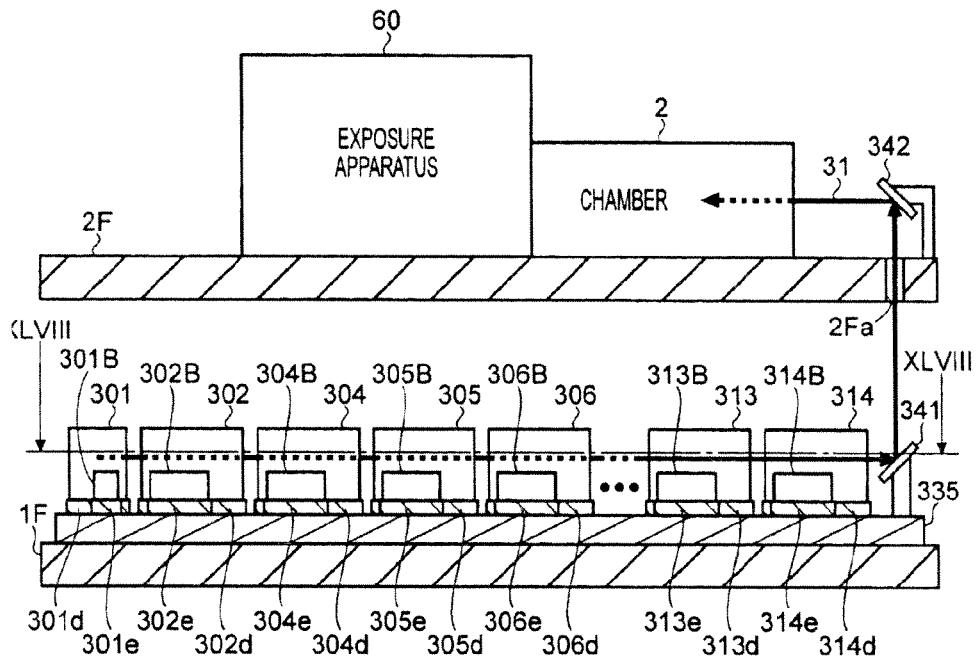
FIG. 47 is a sectional view illustrating the laser apparatus shown in FIG. 37 installed on a subfab floor, and a chamber and an exposure apparatus installed on a floor upstairs.
Figure 48:
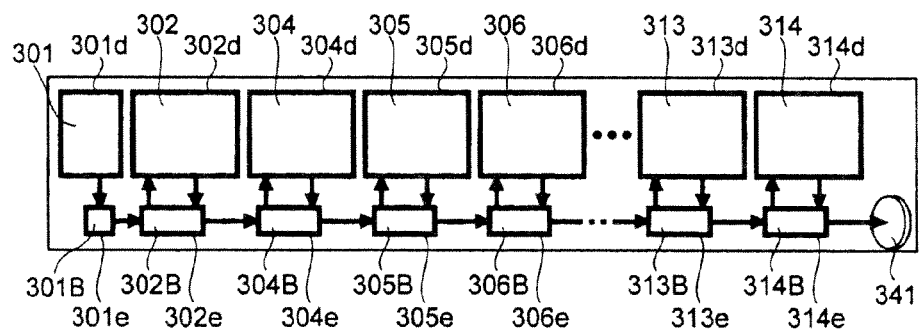
FIG. 48 is a sectional view of the laser apparatus along XLVIII-XLVIII plane in FIG. 47.

FIG. 47 is a sectional view illustrating the laser apparatus 3A installed in a subfab floor (hereinafter referred to as "subfab") 1F and the chamber 2 and an exposure apparatus 60 installed on a floor 2F upstairs. FIG. 48 is a sectional view of the laser apparatus along XLVIII-XLVIII plane in FIG. 47.

The optical modules 331, such as the master oscillator 301, the spatial filter 302, the amplifiers 304, 306, 311, and 313, and the relay optical systems 305, 310, 312, and 314 may be placed on the face plate 335 in the subfab 1F using positioning plates 301d, 302d, 304d through 306d, 313d, and 314d, respectively. Further, the beam adjusting unit 332, the measuring unit 333, and the control unit 334 provided to each of the optical modules 331 may be configured as a unit. In the description to follow, these units may be designated as alignment units 301B, 302B, 304E through 307B, and 310B through 314B. The alignment units 301B, 302B, 304B through 306B, 313B, and 314B may also be provided on the face plate 335 in the subfab 1F using positioning plates 301e, 302e, 304e through 306e, 313e, and 314e, respectively. Here, the face plate 335 may be formed integrally, or may be formed, by tightly connecting a plurality of face plates that can be positioned as shown in FIG. 47. Further, the face plate 335 may be installed on a floor via a damper or the like for reducing vibration from the floor. Furthermore, when the floor itself has a vibration-damping function, the optical modules may be positioned directly on the floor. If this is the case, the floor may be seen as the face plate 335.

The pulsed laser beam 31 outputted from the laser apparatus 3A may be reflected by the mirror 341 with high reflectivity, travel through a through-hole 2Fa in the floor 2F, and be incident on the mirror 342. The pulsed laser beam 31 reflected by the mirror 342 may enter the chamber 2. The laser apparatus 3A and the chamber 2 may be connected by a beam delivery path pipe (not shown) via the mirrors 341 and 342. Preferably, the interior of the beam delivery path pipe may be purged by an inert gas ($N_2$, He, or the like).

Figure 49:
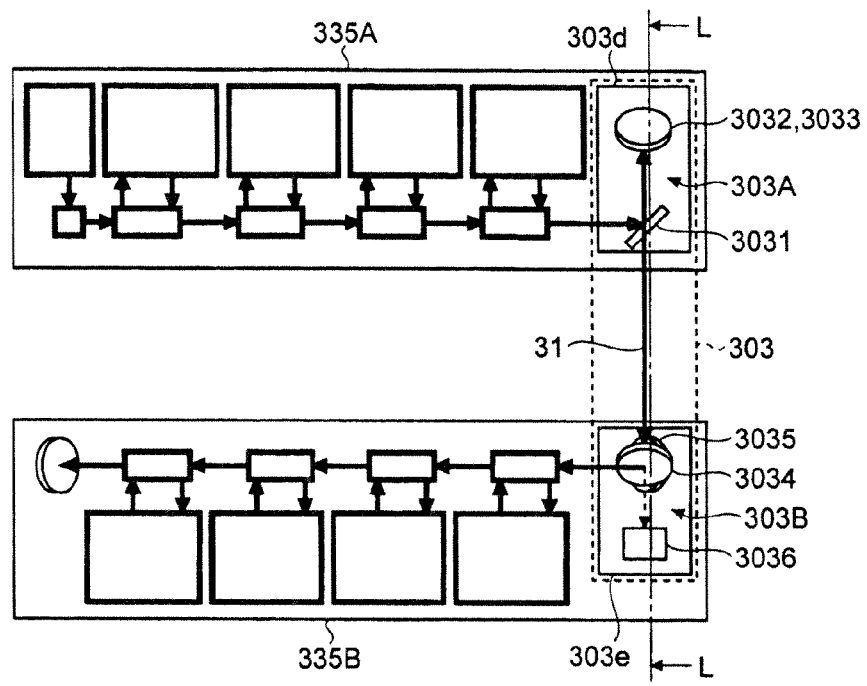
FIG. 49 is a top view illustrating another configuration of the laser apparatus shown in FIG. 37 installed on the subfab floor.
Figure 50:
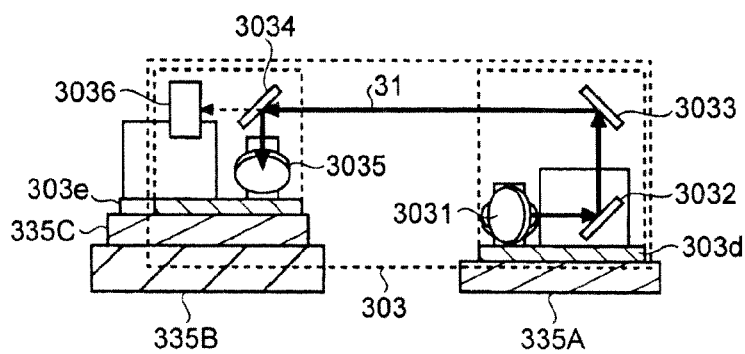
FIG. 50 is a sectional view of the laser apparatus along L-L plane in FIG. 49.

FIGS. 49 and 50 illustrate another installation example of the laser apparatus 3A. FIG. 49 is a top view showing an example of the arrangement of the laser apparatus 3A in the subfab. FIG. 50 is a sectional view of the laser apparatus 3A along L-L plane in FIG. 49. As illustrated in FIGS. 49 and 50, the laser apparatus 3A may be installed across face plates 335A and 335B. Depending on the required laser output, the laser apparatus may greatly be increased in size, and the beam delivery path may greatly be increased in length. In such case, when the laser apparatus 3A is installed on a single face plate 335, the face plate 335 may expand or shrink due to a variation in surrounding temperature. As a result, the spatial position of the beam delivery path in the laser apparatus 3A may vary. If this is the case, the laser apparatus 3A may be installed across a plurality of face plates, and the face plates may be installed with a space therebetween. For example, as illustrated in FIGS. 49 and 50, when two face plates are used, a beam adjusting unit 303A may be disposed at an output side of a face plate 335A on which the master oscillator 301 is installed. Further, a measuring unit 303B may be disposed at a position at which the pulsed laser beam 31 outputted from the beam adjusting unit 303A is incident thereon on a face plate 335B.

The beam adjusting unit 303A may include mirrors 3031 through 3033, of which the posture can be controlled. The measuring unit 303B may include a beam splitter 3034, a mirror 3035, and a sensor 3036. The mirrors 3031 through 3033 in the beam adjusting unit 303A may be controlled by a control unit (not shown) based on values measured by the measuring unit 303B, as in the above-described optical devices. With this, the beam delivery path between the face plates 335A and 335B can be aligned. As a result, even when the plurality of the face plates is used, the beam delivery path between the face plates can be aligned.

13.1 Positioning with Pins

A positioning mechanism for an individual optical device will be described with examples. In the description to follow, the optical device 330A shown in FIG. 5 will be cited as an example.

Figure 51:
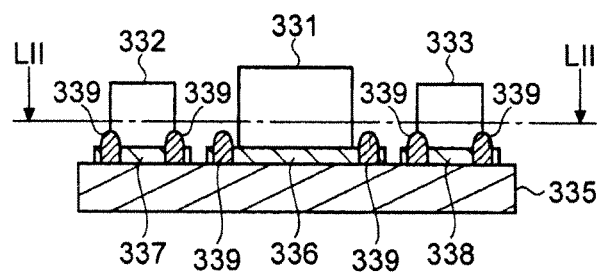
FIG. 51 illustrates an example of positioning mechanisms for the optical device using positioning pins according to an embodiment.
Figure 52:
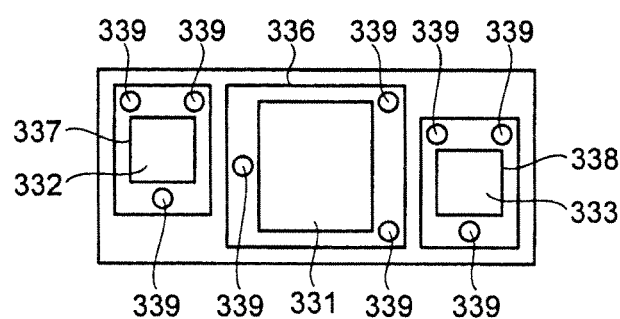
FIG. 52 is a sectional view of the positioning mechanisms along LII-LII plane in FIG. 51.

FIG. 51 shows an example of the positioning mechanism for the optical device using positioning pins. FIG. 52 is a sectional view of the positioning mechanisms along LII-LII plane in FIG. 51. As described above, the optical module 331, the beam adjusting unit 332, and the measuring unit 333 may be provided on the positioning plates 336 through 338, respectively. The positioning plates 336 through 338 may be held on the face plate 335 in a state in which the installation positions thereof are restricted by positioning pins 339 provided on the face plate 335, for example. With this, the optical device may be aligned roughly with ease. Here, the positioning plates 336 through 338 may respectively have holes of predetermined diameter and depth at predetermined positions, into which the positioning pins 339 provided to the face plate 335 fit, respectively. Three positioning pins per positioning plate are provided in the example, but two positioning pins can be provided per positioning plate.

13.2 Positioning with Rails

Figure 53:
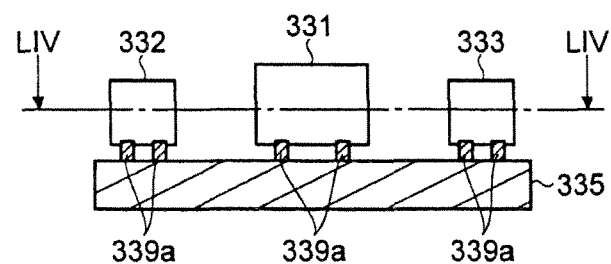
FIG. 53 illustrates another example of positioning mechanisms for the optical device using rails according to another embodiment.
Figure 54:
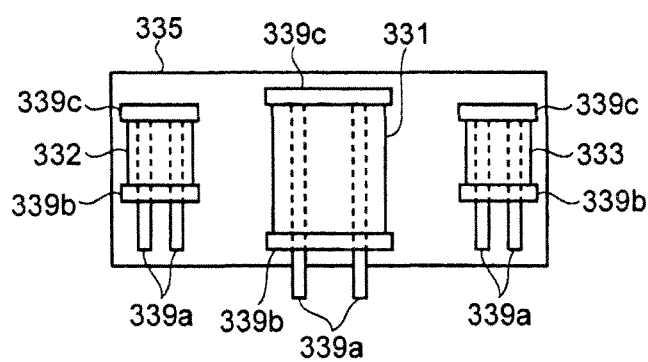
FIG. 54 is a sectional view of the positioning mechanisms along LIV-LIV plane in FIG. 53.

FIG. 53 shows an example of the positioning mechanism for the optical device using rails. FIG. 54 is a sectional view of the positioning mechanisms along LIV-LIV plane in FIG. 53. As illustrated in FIGS. 53 and 54, the optical module 331, the beam adjusting unit 332, and the measuring unit 333 may be slidingly moved on the face plate 335 with rails 339a and wheels or the like (not shown). The rails 339a may be provided on the positioning plates 336 through 338 at predetermined positions. Alternatively, the rails 339a may be provided directly on the face plate 335 at the predetermined positions. Positioning blocks 339c for stopping the optical module 331, the beam adjusting unit 332, and the measuring unit 333 at set positions may be provided at the terminal ends of the respective rails 339a. The positioning blocks 339c may serve to secure position reproducibility when the optical module 331 is replaced. The optical module 331, the beam adjusting unit 332, and the measuring unit 333 may be fixed by blocks 339b after the module 331 and units 332 and 333 are positioned at the set positions, respectively. In this way, making the optical module 331, the beam adjusting unit 332, and the measuring unit 333 movable by moving mechanisms may allow them to be easily installed, maintained, or replaced even when they are heavy and hard to be moved manually.

Figure 55:
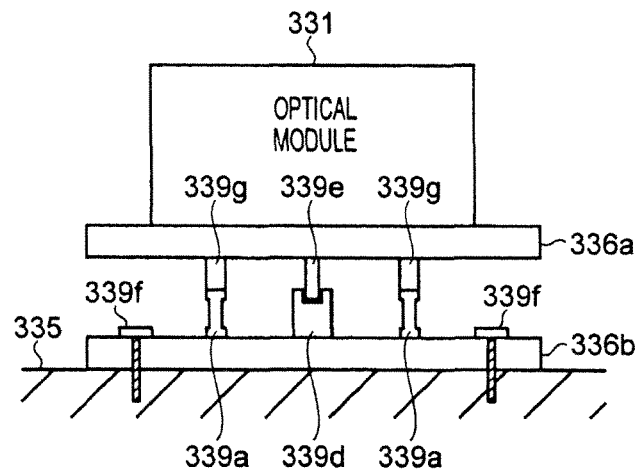
FIG. 55 illustrates an example of an individual positioning mechanism using rails according to an embodiment.

Here, FIG. 55 shows an example of an individual positioning mechanism using rails. With reference to FIG. 55, the optical module 331 will be described as an example. In the example shown in FIG. 55, the positioning plate may include a carriage 336a on which the optical module 331 is mounted at a predetermined position and a base 336b provided on the face plate 335. The base 336b may be provided on the face plate 335 with bolts 339f, for example. The base 336b may be provided with the rails 339a extending in the direction into which the carriage 336a slides and a groove mechanism 339d for preventing a run-off. Meanwhile, the carriage 336a may be provided with wheels 339g for allowing the carriage 336a to travel along the rails 339a, and a run-off prevention plate 339e slidingly fitted in the groove mechanism 339d for preventing a run-off. The wheels 339g may be provided for the carriage 336a to travel along the rails 339a. The groove mechanism 339d and the run-off prevention plate 339e may not only prevent the wheels 339g from running off the respective rails 339a, but also restrict the offset in the widthwise direction (direction perpendicular to the traveling direction) of the carriage 336a with respect to the base 336b to a minimum. Because of the groove mechanism 339d and the run-off prevention plate 339e, the optical module 331 cannot move in the widthwise direction.

Figure 56:
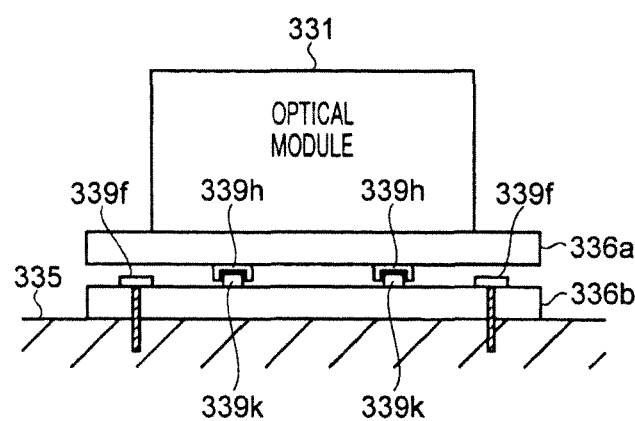
FIG. 56 illustrates another example of an individual positioning mechanism using rails according to another embodiment.

FIG. 56 shows another example of the positioning mechanism using rails. As illustrated in FIG. 56, in this example, the base 336b may be provided with slide rails (male) 339k, in place of the rails 339a. Meanwhile, the carriage 336a may be provided with slide rails (female) 339h that engage with the respective slide rails 339k, in place of the wheels 339g. The slide rails 339k and 339h may not only allow the carriage 336a to slide on the base 336b, but also restrict the offset in the widthwise direction (direction perpendicular to the traveling direction) of the carriage 336a with respect to the base 336b to a minimum. Other configurations may be similar to the configuration shown in FIG. 55.

14. Supplementary Description

Figure 57:
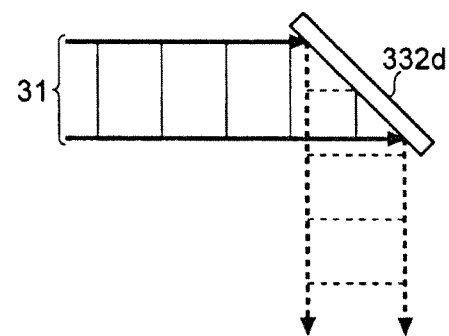
FIG. 57 shows an example of VRWM.
Figure 58:
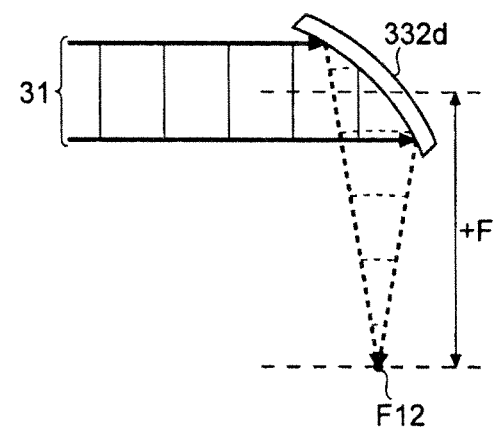
FIG. 58 shows an example of VRWM.
Figure 59:
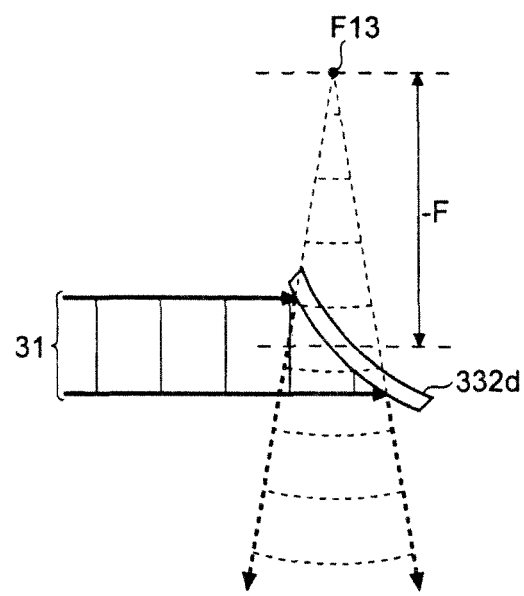
FIG. 59 shows an example of VRWM.

Here, the above-mentioned VRWM 332d will be described. FIGS. 57 through 59 show an example of the VRWM 332d. As illustrated in FIGS. 57 through 59, the VRWM 332d may be a deformable mirror, of which the curvature of the reflective surface can be modified. The VRWM 332d may reflect the collimated pulsed laser beam 31 incident thereon as a collimated laser beam, when the reflective surface thereof is flat, as illustrated in FIG. 57. The VRWM 332d, when the curvature of the reflective surface thereof is adjusted to be concave, may reflect the collimated pulsed laser beam 31 incident thereon such that the pulsed laser beam 31 is focused at a predetermined focus F12 distanced therefrom by a focal distance +F, as illustrated in FIG. 58. Alternatively, the VRWM 332d, when the curvature of the reflective surface thereof is adjusted to be convex, may reflect the collimated pulsed laser beam 31 incident thereon as a convex beam such that the pulsed laser beam 31 may be focused at a virtual focus F13 distanced therefrom by a focal distance −F, as illustrated in FIG. 59. As described above, using the VRWM 332d, of which the curvature of the reflective surface can be modified, may make it possible to adjust the wavefront of the reflected laser beam to a predetermined wavefront in accordance with the wavefront of the incident laser beam.

The above-described embodiments and the modifications thereof are merely examples for implementing this disclosure, and this disclosure is not limited thereto. Making various modifications according to the specifications or the like is within the scope of this disclosure, and it is apparent from the above description that other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not being limited to the stated elements." The term "have" should be interpreted as "including the stated elements but not being limited to the stated elements." Further, the modifier "one (a/an)" should be interpreted as "at least one" or "one or more."

What is claimed is:

1. An extreme ultraviolet light generation system including a laser apparatus, an optical device included in the laser apparatus, comprising:
   first and second optical modules disposed in a beam delivery path of a laser beam outputted from the laser apparatus;
   first and second beam adjusting units disposed in the beam delivery path for adjusting the beam delivery path of the laser beam;
   first and second measuring units disposed in the beam delivery path for detecting the beam delivery path of the laser beam passed through the first and second optical modules, respectively;
   a first control unit for controlling the first beam adjusting unit based on a detection result of the beam delivery path of the laser beam detected by the first measuring unit;
   a second control unit for controlling the second beam adjusting unit based on a detection result of the beam delivery path of the laser beam detected by the second measuring unit;
   a control system for controlling the first and second control units; and
   a positioning mechanism for positioning at least the first and second optical modules, wherein
   the first optical module is a first amplifier for amplifying the laser beam,
   the second optical module is a second amplifier disposed at an output side of the first optical module for amplifying the laser beam passed through the first optical module,
   the first measuring unit is disposed between the first optical module and the second optical module,
   the second measuring unit is disposed at an output side of the second optical module,
   the first beam adjusting unit is disposed at an input side of the first measuring unit,
   the second beam adjusting unit is disposed at an output side of the first measuring unit and at an input side of the second measuring unit,
   the positioning mechanism positions at least the first and second amplifiers, and
   the positioning mechanism further positions the first and second measuring units and the first and second beam adjusting units.

2. The extreme ultraviolet light generation system according to claim 1, wherein
   the first and second beam adjusting units are disposed at input sides of the first and second optical modules, respectively.

3. The extreme ultraviolet light generation system according to claim 1, further comprising:
   a guide laser apparatus for outputting a guide laser beam at a wavelength that differs from a wavelength of the laser beam; and
   a beam delivery path combining unit for substantially combining the beam delivery path of the guide laser beam with the beam delivery path of the laser beam.

4. The extreme ultraviolet light generation system according to claim 3, wherein
   the first and second measuring units detect the beam delivery path of the guide laser beam, and
   the first and second control units control the first and second beam adjusting units based on detection results of the beam delivery path of the guide laser beam by the first and second measuring units, respectively.

5. The extreme ultraviolet light generation system according to claim 1, wherein the positioning mechanism restricts installation positions of the first and second amplifiers, the first and second measuring units and the first and second beam adjusting units.

6. The extreme ultraviolet light generation system according to claim 1, wherein the positioning mechanism includes convex portions for restricting installation positions of the first and second amplifiers, the first and second measuring units and the first and second beam adjusting units.

7. The extreme ultraviolet light generation system according to claim 6, wherein the convex portions are pins.

8. The extreme ultraviolet light generation system according to claim 6, wherein the positioning mechanism includes concave portions corresponding to the convex portions.

9. The extreme ultraviolet light generation system according to claim 8, wherein the concave portions are holes.

10. The extreme ultraviolet light generation system according to claim 8, wherein the concave portions are grooves.

11. The extreme ultraviolet light generation system according to claim 8, wherein the convex portions are fitted in the concave portions.

12. The extreme ultraviolet light generation system according to claim 11, wherein the convex portions restrict each of the installation positions of the first and second amplifiers, the first and second measuring units and the first and second beam adjusting units by three points.

13. The extreme ultraviolet light generation system according to claim 12, wherein the positioning mechanism positions the first and second amplifiers, the first and second measuring units and the first and second beam adjusting units on a support portion.

14. The extreme ultraviolet light generation system according to claim 1, wherein each of the first and second amplifiers is a fast-axial-flow amplifier.

15. The extreme ultraviolet light generation system according to claim 1, wherein each of the first and second beam adjusting units includes a deformable mirror.

16. The extreme ultraviolet light generation system according to claim 15, wherein the deformable mirror is a variable radius waveform mirror.

17. The extreme ultraviolet light generation system according to claim 1, wherein each of the first and second measuring units includes a beam profiler and an energy sensor.

18. The extreme ultraviolet light generation system according to claim 17, wherein each of the first and second measuring units includes a beam splitter and a lens.

19. The extreme ultraviolet light generation system according to claim 18, wherein each of the first and second measuring units includes a plate with a through-hole.

20. The extreme ultraviolet light generation system according to claim 1, wherein
   the positioning mechanism positions the first and second amplifiers, the first and second measuring units and the first and second beam adjusting units on a support portion,
   at least the first measuring unit and the first beam adjusting unit are unitized as a first alignment unit,
   at least the second measuring unit and the second beam adjusting unit are unitized as a second alignment unit,
   the first and second amplifiers are placed on the support portion adjacent to one another, the first and second alignment units are placed on the support portion adjacent to one another,
an inlet and an outlet of the laser beam of each of the first and second amplifiers are formed on a same surface, and
the first alignment unit and the second alignment unit are placed to face the inlet and outlet of the first amplifier and the inlet and outlet of the second amplifier, respectively.

\* \* \* \* \*